US011982244B1

(12) United States Patent
Sattler et al.

(10) Patent No.: US 11,982,244 B1
(45) Date of Patent: May 14, 2024

(54) SYSTEM AND METHOD FOR IN-CYLINDER DOSING (ICD) FOR AN ENGINE

(71) Applicant: Caterpillar Inc., Peoria, IL (US)

(72) Inventors: Michael Edward Sattler, Eureka, IL (US); Daniel Reese Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/082,608

(22) Filed: Dec. 16, 2022

(51) Int. Cl.

| | |
|---|---|
| ***F02D 41/02*** | (2006.01) |
| ***F01N 3/025*** | (2006.01) |
| ***F01N 9/00*** | (2006.01) |
| ***F02D 41/00*** | (2006.01) |
| ***F02D 41/20*** | (2006.01) |

(52) U.S. Cl.

CPC ......... *F02D 41/025* (2013.01); *F01N 3/0253* (2013.01); *F01N 9/002* (2013.01); *F02D 41/008* (2013.01); *F02D 41/029* (2013.01); *F02D 41/20* (2013.01); *F01N 2430/085* (2013.01); *F01N 2610/03* (2013.01); *F01N 2610/146* (2013.01); *F01N 2900/0412* (2013.01); *F01N 2900/08* (2013.01); *F02D 2041/2017* (2013.01); *F02D 2200/101* (2013.01)

(58) Field of Classification Search

CPC .. F01N 3/0253; F01N 9/002; F01N 2430/085; F01N 2610/03; F01N 2610/146; F01N 2900/0412; F01N 2900/08; F02D 41/008; F02D 41/025; F02D 41/029; F02D 2041/2017; F02D 2200/101

USPC .......... 60/285, 286, 295, 300, 303, 311, 320

See application file for complete search history.

(56) References Cited

U.S. PATENT DOCUMENTS

| | | | |
|---|---|---|---|
| 7,140,345 B2 | 11/2006 | Gioannini et al. | |
| 7,779,622 B2 | 8/2010 | Kondou et al. | |
| 8,156,730 B2 * | 4/2012 | Guo | F02D 41/029 60/285 |
| 8,272,207 B2 | 9/2012 | Kurtz | |
| 9,988,999 B2 | 6/2018 | Ancimer et al. | |
| 10,794,251 B2 | 10/2020 | Ulstad et al. | |

(Continued)

FOREIGN PATENT DOCUMENTS

| | | | |
|---|---|---|---|
| CN | 104819042 A * | 8/2015 | F02D 41/0245 |
| DE | 102012018954 A1 * | 3/2014 | F02D 41/029 |

(Continued)

*Primary Examiner* — Jorge L Leon, Jr.

(74) *Attorney, Agent, or Firm* — Xsensus, LLP

(57) ABSTRACT

This disclosure relates generally to emissions treatment devices including aftertreatment devices that may be utilized with internal combustion engines and, more particularly, to methods and systems for controlling in-cylinder dosing (ICD) and preventing fuel to oil dilution. A method of operating an engine converting an amount of heat needed for regenerating an aftertreatment device into a cam-stroke fueling strategy. The method further includes determining a number of the engine's cylinders to be active cylinders for introducing dosing fuel and calculating a total dosing fuel apportionment of the dosing fuel for each of the active cylinders based on the cam-stroke fueling strategy. A number of dosing shots per injector for each of the active cylinders can be calculated based on the total dosing fuel apportionment and an amount of dosing fuel is apportioned for each dosing shot according to the cam-stroke fueling strategy.

20 Claims, 13 Drawing Sheets

(56) References Cited

U.S. PATENT DOCUMENTS

| | | | | |
|---|---|---|---|---|
| 2005/0137779 | A1* | 6/2005 | Gioannini | F02D 41/405 701/101 |
| 2009/0188236 | A1* | 7/2009 | Yokota | F02D 41/0275 60/299 |
| 2009/0235645 | A1* | 9/2009 | Noda | F01N 13/009 60/299 |
| 2014/0026539 | A1* | 1/2014 | Kurtz | F02D 41/024 60/273 |
| 2016/0252028 | A1* | 9/2016 | Dutto | F02D 41/14 60/274 |
| 2017/0152808 | A1* | 6/2017 | Ricci | F02D 41/405 |
| 2018/0080358 | A1* | 3/2018 | Ulstad | F01N 9/002 |
| 2019/0085745 | A1* | 3/2019 | Mauro | F02D 41/405 |

FOREIGN PATENT DOCUMENTS

| | | | | | |
|---|---|---|---|---|---|
| FR | 2910063 | A1 | * | 6/2008 | F02D 41/0087 |
| JP | 2021092201 | A | * | 6/2021 | |

* cited by examiner

| ICD extra fuel allocation map | | | | | | | | | | | |
|---|---|---|---|---|---|---|---|---|---|---|---|
| | | Shot number | | | | | | | | | |
| | | 1 | 2 | 3 | 4 | 5 | 6 | 7 | 8 | 9 | 10 |
| Cylinder total shots | 1 | 1.0000 | | | | | | | | | |
| | 2 | 0.5600 | 0.4400 | | | | | | | | |
| | 3 | 0.3603 | 0.3243 | 0.3153 | | | | | | | |
| | 4 | 0.2833 | 0.2436 | 0.2372 | 0.2359 | | | | | | |
| | 5 | 0.2335 | 0.1954 | 0.1908 | 0.1899 | 0.1893 | | | | | |
| | 6 | 0.1997 | 0.1634 | 0.1601 | 0.1594 | 0.1590 | 0.1585 | | | | |
| | 7 | 0.1733 | 0.1404 | 0.1380 | 0.1375 | 0.1372 | 0.1369 | 0.1365 | | | |
| | 8 | 0.1526 | 0.1232 | 0.1214 | 0.1211 | 0.1208 | 0.1206 | 0.1203 | 0.1200 | | |
| | 9 | 0.1359 | 0.1098 | 0.1084 | 0.1081 | 0.1080 | 0.1078 | 0.1076 | 0.1074 | 0.1071 | |
| | 10 | 0.1225 | 0.0990 | 0.0979 | 0.0977 | 0.0976 | 0.0974 | 0.0973 | 0.0971 | 0.0969 | 0.0967 |

FIG. 4A

| Example of ICD shot allocation for a cylinder based on the min fuel and the total ICD cylinder fuel min fuel 3 | | | | | | | | | | | |
|---|---|---|---|---|---|---|---|---|---|---|---|
| Total ICD cylinder fuel 83 | | Shot number | | | | | | | | | |
| Cylinder total shots | **Extra fuel** | **1** | **2** | **3** | **4** | **5** | **6** | **7** | **8** | **9** | **10** |
| **1** | 80.0 | 83.0 | 0.0 | 0.0 | 0.0 | 0.0 | 0.0 | 0.0 | 0.0 | 0.0 | 0.0 |
| **2** | 77.0 | 46.1 | 36.9 | 0.0 | 0.0 | 0.0 | 0.0 | 0.0 | 0.0 | 0.0 | 0.0 |
| **3** | 74.0 | 29.7 | 27.0 | 26.3 | 0.0 | 0.0 | 0.0 | 0.0 | 0.0 | 0.0 | 0.0 |
| **4** | 71.0 | 23.1 | 20.3 | 19.8 | 19.8 | 0.0 | 0.0 | 0.0 | 0.0 | 0.0 | 0.0 |
| **5** | 68.0 | 18.9 | 16.3 | 16.0 | 15.9 | 15.9 | 0.0 | 0.0 | 0.0 | 0.0 | 0.0 |
| **6** | 65.0 | 16.0 | 13.6 | 13.4 | 13.4 | 13.3 | 13.3 | 0.0 | 0.0 | 0.0 | 0.0 |
| **7** | 62.0 | 13.7 | 11.7 | 11.6 | 11.5 | 11.5 | 11.5 | 11.5 | 0.0 | 0.0 | 0.0 |
| **8** | 59.0 | 12.0 | 10.3 | 10.2 | 10.1 | 10.1 | 10.1 | 10.1 | 10.1 | 0.0 | 0.0 |
| **9** | 56.0 | 10.6 | 9.1 | 9.1 | 9.1 | 9.0 | 9.0 | 9.0 | 9.0 | 9.0 | 0.0 |
| **10** | 53.0 | 9.5 | 8.2 | 8.2 | 8.2 | 8.2 | 8.2 | 8.2 | 8.1 | 8.1 | 8.1 |

| Example of ICD shot allocation for a cylinder based on the min fuel and the total ICD cylinder fuel min fuel 3 | | | | | | | | | | | |
|---|---|---|---|---|---|---|---|---|---|---|---|
| Total ICD cylinder fuel 31 | | Shot number | | | | | | | | | |
| Cylinder total shots | Extra fuel | 1 | 2 | 3 | 4 | 5 | 6 | 7 | 8 | 9 | 10 |
| 1 | 28.0 | 31.0 | 0.0 | 0.0 | 0.0 | 0.0 | 0.0 | 0.0 | 0.0 | 0.0 | 0.0 |
| 2 | 25.0 | 17.0 | 14.0 | 0.0 | 0.0 | 0.0 | 0.0 | 0.0 | 0.0 | 0.0 | 0.0 |
| 3 | 22.0 | 10.9 | 10.1 | 9.9 | 0.0 | 0.0 | 0.0 | 0.0 | 0.0 | 0.0 | 0.0 |
| 4 | 19.0 | 8.4 | 7.6 | 7.5 | 7.5 | 0.0 | 0.0 | 0.0 | 0.0 | 0.0 | 0.0 |
| 5 | 16.0 | 6.8 | 6.1 | 6.1 | 6.0 | 6.0 | 0.0 | 0.0 | 0.0 | 0.0 | 0.0 |
| 6 | 13.0 | 5.6 | 5.1 | 5.1 | 5.1 | 5.1 | 5.1 | 0.0 | 0.0 | 0.0 | 0.0 |
| 7 | 10.0 | 4.7 | 4.4 | 4.4 | 4.4 | 4.4 | 4.4 | 4.4 | 0.0 | 0.0 | 0.0 |
| 8 | 7.0 | 4.1 | 3.9 | 3.8 | 3.8 | 3.8 | 3.8 | 3.8 | 3.8 | 0.0 | 0.0 |
| 9 | 4.0 | 3.5 | 3.4 | 3.4 | 3.4 | 3.4 | 3.4 | 3.4 | 3.4 | 3.4 | 0.0 |
| 10 | 1.0 | 3.1 | 3.1 | 3.1 | 3.1 | 3.1 | 3.1 | 3.1 | 3.1 | 3.1 | 3.1 |

Example of ICD shot allocation for a cylinder based on the min fuel and the total ICD cylinder fuel min fuel 3

Total ICD cylinder fuel 17

| Cylinder total shots | Extra fuel | Shot number 1 | 2 | 3 | 4 | 5 | 6 | 7 | 8 | 9 | 10 |
|---|---|---|---|---|---|---|---|---|---|---|---|
| **1** | 14.0 | 17.0 | 0.0 | 0.0 | 0.0 | 0.0 | 0.0 | 0.0 | 0.0 | 0.0 | 0.0 |
| **2** | 11.0 | 9.2 | 7.8 | 0.0 | 0.0 | 0.0 | 0.0 | 0.0 | 0.0 | 0.0 | 0.0 |
| **3** | 8.0 | 5.9 | 5.6 | 5.5 | 0.0 | 0.0 | 0.0 | 0.0 | 0.0 | 0.0 | 0.0 |
| **4** | 5.0 | 4.4 | 4.2 | 4.2 | 4.2 | 0.0 | 0.0 | 0.0 | 0.0 | 0.0 | 0.0 |
| **5** | 2.0 | 3.5 | 3.4 | 3.4 | 3.4 | 3.4 | 0.0 | 0.0 | 0.0 | 0.0 | 0.0 |
| **6** | -1.0 | 0.0 | 0.0 | 0.0 | 0.0 | 0.0 | 0.0 | 0.0 | 0.0 | 0.0 | 0.0 |
| **7** | -4.0 | 0.0 | 0.0 | 0.0 | 0.0 | 0.0 | 0.0 | 0.0 | 0.0 | 0.0 | 0.0 |
| **8** | -7.0 | 0.0 | 0.0 | 0.0 | 0.0 | 0.0 | 0.0 | 0.0 | 0.0 | 0.0 | 0.0 |
| **9** | -10.0 | 0.0 | 0.0 | 0.0 | 0.0 | 0.0 | 0.0 | 0.0 | 0.0 | 0.0 | 0.0 |
| **10** | -13.0 | 0.0 | 0.0 | 0.0 | 0.0 | 0.0 | 0.0 | 0.0 | 0.0 | 0.0 | 0.0 |

SYSTEM AND METHOD FOR IN-CYLINDER DOSING (ICD) FOR AN ENGINE

TECHNICAL FIELD

This patent disclosure relates generally to emissions treatment systems including aftertreatment systems that may be utilized with internal combustion engines and, more particularly, to methods and systems for controlling in-cylinder dosing (ICD) for an engine.

BACKGROUND

Some engines (e.g., U.S. EPA Tier 4 emission compliant engines) utilize an emissions treatment device or aftertreatment device which is disposed in the exhaust system of the engine. Such devices may utilize a particulate filter (PF) (e.g., a diesel particulate filter (DPF)) and/or a catalyst that can operate by physically trapping the emission products or by chemically reacting with the emission products to convert them to other forms that may be addressed more readily. Periodically, though, it is often required to regenerate the aftertreatment device to remove accumulation of particulate matter trapped therein and to restore the device to an acceptably operational state.

SUMMARY

The disclosure describes, in one aspect, a method of in-cylinder dosing (ICD) that uses reduced shot sizes and allows for reduced ingestion of hydrocarbon (HC) through the Exhaust Gas Recirculation (EGR) valve during in-cylinder dosing. According to some embodiments, an ICD strategy includes adding support for more ICD shots and dividing the per injector fuel amongst as many small shots that are allowed. The ICD strategy, in accordance with some embodiments, is a function of high voltage power supply wattage, engine speed (ENGSPD), a number of ICD allowed cylinders, and/or a number of combustion cycle shots. In some embodiments, the method includes cylinder specific ICD disablement based on a total number of ICD allowed cylinders. In some embodiments, the method includes a boost or thermal power limited cam-cycle based total shot calculation. In some embodiments, the method includes non-uniform cylinder shot-count allocation.

According to some embodiments, an engine includes a plurality of combustion chambers each having a piston reciprocally movable therein to perform a combustion cycle, an aftertreatment device disposed in an exhaust system communicating with the plurality of combustion chambers, a plurality of injectors disposed one each in the plurality of combustion chambers to introduce a total regeneration quantity of dosing fuel for regenerating the aftertreatment device. The engine also includes a controller communicating with the plurality of injectors and configured to determine a number of active combustion chambers to introduce the dosing fuel and to determine a number of dosing shots per injector for each of the active combustion chambers. A first total apportionment of the dosing fuel is allocated to the injector of a first active combustion chamber and, according to some embodiments, a distribution of the first total apportionment of dosing fuel is non-uniform across the dosing shots determined for the first active combustion chamber. In some embodiments, the controller is further configured to receive an amount of heat needed for regenerating the aftertreatment device and converts the amount of heat into a cam-stroke fueling to determine the number of dosing shots per injector for each of the active combustion chambers. In some embodiments, the first total apportionment of dosing fuel is a gradient having a greater amount of the dosing fuel apportioned to the dosing shots that occur earlier in the number of dosing shots for the first active combustion chamber than an amount of the dosing fuel apportioned to the shots that occur later. The controller, according to some embodiments, uses a bitmap to identify the combustion chambers to be active for introducing the total regeneration quantity of dosing fuel. In accordance with some embodiments, the controller is further configured to use a 4-tier waveform and maintain a current at a hold-in level for each dosing shot. In some embodiments, a second total apportionment of the dosing fuel is allocated to the injector of a second active combustion chamber, a distribution of the second total apportionment of dosing fuel being non-uniform across the dosing shots determined for the second active combustion chamber and the second total apportionment of dosing fuel being different from the first total apportionment of dosing fuel.

According to some embodiments, a method of operating an engine, the engine including, a plurality of cylinders each having a piston reciprocally movable therein to perform a combustion cycle, an aftertreatment device disposed in an exhaust system, and a plurality of injectors disposed one each in the plurality of cylinders to introduce a total regeneration quantity of dosing fuel for regenerating the aftertreatment device, the method including: converting an amount of heat needed for regenerating the aftertreatment device into a cam-stroke fueling strategy; determining a number of active cylinders to introduce the dosing fuel based on the cam-stroke fueling strategy; calculating a total dosing fuel apportionment of the dosing fuel for each of the active cylinders based on the cam-stroke fueling strategy; determining a number of dosing shots per injector for each of the active cylinders based on the total dosing fuel apportionment; apportioning an amount of dosing fuel for each dosing shot according to the cam-stroke fueling strategy; and actuating the injectors of the active cylinders to inject the dosing fuel in the apportioned amounts for each dosing shot. In some embodiments, the method includes using a bitmap to identify the active cylinders. According to some embodiments, calculating the total dosing fuel apportionment of the dosing fuel for each of the active cylinders includes calculating the dosing shot apportionments based on a single shot boost energy and a predetermined pull-in current. Calculating the total dosing fuel apportionment of the dosing fuel for each of the active cylinders, in accordance with some embodiments, includes calculating the dosing shot apportionments based on an engine speed. In some embodiments, the method includes determining a cylinder number rank of the active cylinders to introduce extra dosing shots. In some embodiments, determining the cylinder number rank is based on cylinder positions. In some embodiments, determining the number of dosing shots per injector for each of the active cylinders includes determining a number of cylinders to allocate an extra dosing shot and allocating the extra dosing shot to the cylinders based on the cylinder number rank. Calculating the total dosing fuel apportionment of the dosing fuel for each of the active cylinders, in some embodiments, also includes distributing extra dosing fuel for each shot according to a map of extra fuel apportionment per shot vs. cylinder dosing shots and shot number.

According to some embodiments, a non-transitory computer readable storage device includes a program that when executed by circuitry in an engine configures the circuitry to perform in-cylinder dosing (ICD) control for the engine, wherein the circuitry is configured by the program to control in-cylinder dosing (ICD) for regenerating an aftertreatment device associated with the engine, the program causing the circuitry to further perform converting an amount of heat needed for regenerating the aftertreatment device into a cam-stroke fueling strategy. The program causes the circuitry to further perform: determining a number of active cylinders of the engine to introduce dosing fuel based on the cam-stroke fueling strategy; calculating a total dosing fuel apportionment of the dosing fuel for each of the active cylinders based on the cam-stroke fueling strategy; determining a number of dosing shots for each of the active cylinders based on the total dosing fuel apportionment; apportioning an amount of dosing fuel for each dosing shot according to the cam-stroke fueling strategy; and actuating injectors of the engine associated with each of the active cylinders to inject the dosing fuel in the apportioned amounts for each dosing shot. In some embodiments, the program causes the circuitry to further perform identifying the active cylinders based on a bitmask. The calculating the total dosing fuel apportionment of the dosing fuel for each of the active cylinders, according to some embodiments, includes the program causing the circuitry to further perform calculating the dosing shot apportionments based on a single shot boost energy and a predetermined pull-in current. In accordance with some embodiments, calculating the total dosing fuel apportionment of the dosing fuel for each of the active cylinders includes the program causing the circuitry to further perform calculating the dosing shot apportionments based on an engine speed. In some embodiments, the program causes the circuitry to further perform determining a cylinder number rank of the active cylinders to introduce extra dosing shots. Calculating the total dosing fuel apportionment of the dosing fuel for each of the active cylinders, in accordance with some embodiments, also includes the program causing the circuitry to further perform distributing extra dosing fuel for each shot according to a map of extra fuel apportionment per shot vs. cylinder dosing shots and shot number. Other features and aspects of this disclosure will be apparent from the following description and the accompanying drawings.

BRIEF DESCRIPTION OF DRAWINGS

FIGS. 4A-4B illustrate an in-cylinder dosing extra fuel allocation map and graph for the active in-cylinder dosing strategy according to some embodiments of the present disclosure.

DETAILED DESCRIPTION

The present disclosure relates to methods and systems for controlling in-cylinder dosing (ICD) of an engine, for instance, to positively affect operation of a downstream aftertreatment system or device. In-cylinder dosing (ICD) may be regarded as a thermal management strategy that uses an in-cylinder injector to inject fuel during the exhaust stroke of a piston to provide unburnt fuel into the exhaust. The unburnt fuel can raise the temperature of the exhaust and induce regeneration of one or more downstream aftertreatment devices.

Figure 1A:
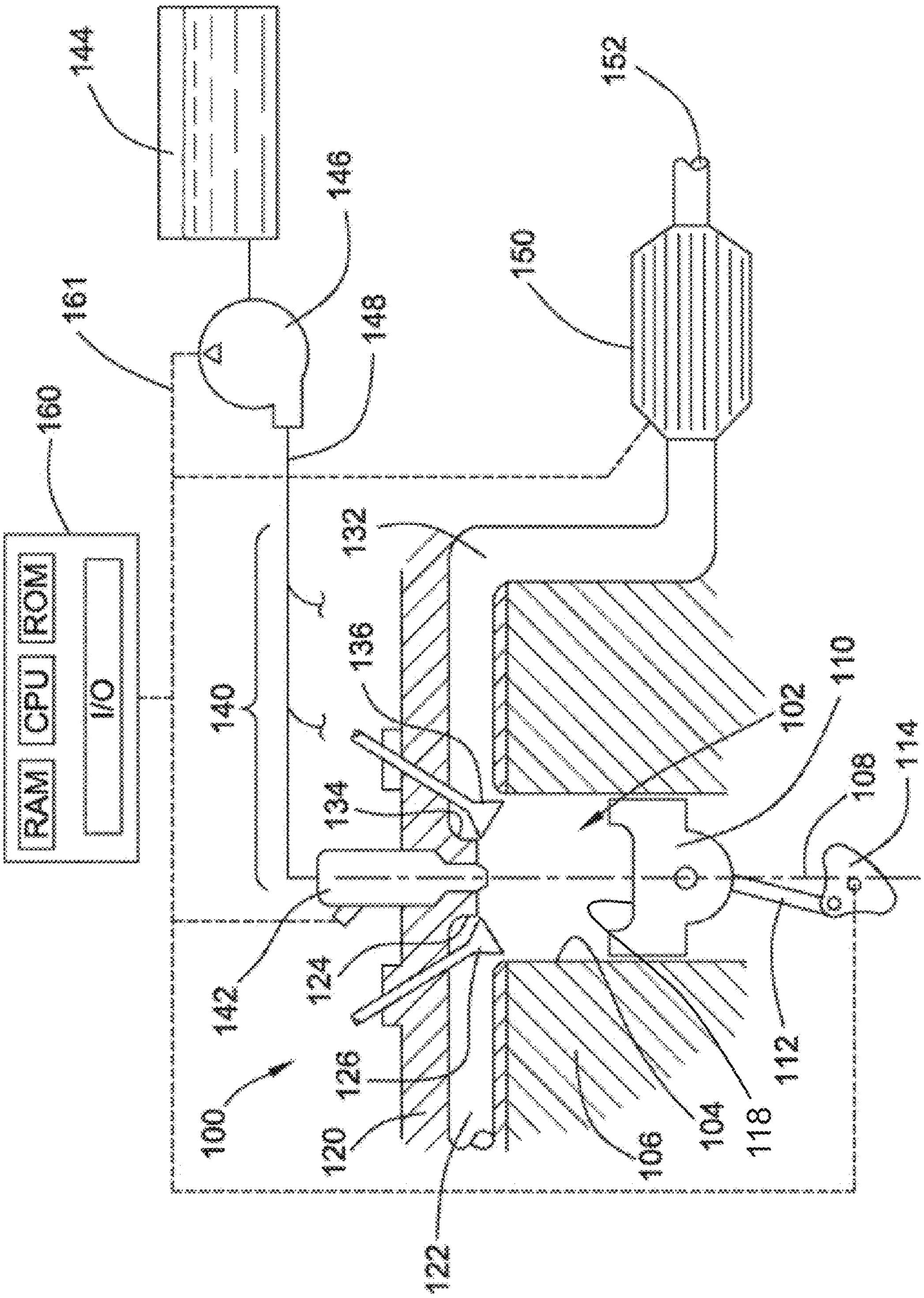
FIG. 1A is a schematic representation of an engine system notably showing a combustion chamber of an internal combustion engine operatively associated with an aftertreatment device according to one or more embodiments of the present disclosure.

Referring to FIG. 1A, wherein like reference numbers refer to like elements, there is illustrated a schematic representation of a system (or systems) comprised of an internal combustion engine 100 (hereinafter "engine 100") particularly depicting a combustion chamber 102 of the engine 100 and some associated components to facilitate the combustion process. Though the embodiment of the engine 100 in FIG. 1A is a diesel-burning, compression ignition engine, other embodiments in other engine configurations such as gasoline-burning, spark ignition engines, are contemplated.

To delineate the combustion chamber 102, an elongated cylinder 104 can be disposed or bored into the material of the engine block 106 and extend along an axis line 108. The combustion chamber 102 therefore can assume a cylindrical shape defined by the walls of the cylinder 104. A piston 110 can be reciprocally disposed in the combustion chamber 102 and can make sliding contact with the walls of the cylinder 104 to reciprocally move upwards and downwards along the axis line 108. To enclose the combustion chamber 102, a cylinder head 120 can be secured to the top of engine block 106. A volume of the combustion chamber 102 can vary based on the space between the walls of the cylinder 104 that are between a crown 118 of the piston 110 and the engine block 106 and an instantaneous position of the crown 118 of the piston 110 within the cylinder 104.

The crown 118 of the piston 110 can correspond to a top surface of the piston 110 that is in fluid communication with gases in the combustion chamber 102. In particular, the piston 110 can reciprocate between an upward most position, referred to as top dead center (TDC) and a downward most position, referred to as bottom dead center (BDC). The piston 110 is pivotally connected to a connecting rod 112 that is operatively coupled to a rotatable crankshaft 114 that converts the linear reciprocal motion of the piston 110 to rotational, powered motion that is transferable and can be harnessed for work. Rotation of the crankshaft 114 corresponds to the upward and downward motion of the piston 110 in the combustion chamber 102. Crankshaft rotation therefore can also correspond to the strokes of a complete combustion cycle through a familiar relation, such as 0°=TDC start of intake (SOI) stroke, 180°=BDC start of compression (SOC), 360°=TDC start of power (SOP) stroke, 540°=BDC start of exhaust (SOE), and 720°=TDC end of cycle (EOC).

To direct intake air to the combustion chamber 102, an intake channel or duct 122 can be disposed through the cylinder head 120 and can communicate with an intake port 124 that opens through the cylinder head 120 into the combustion chamber 102. To selectively open and close the intake port 124, an intake valve 126 such as a poppet valve or the like can be operatively associated with the intake port 124 and can be selectively actuated by a timing mechanism such as overhead cams synchronized to the combustion cycle of the engine 100. Likewise, to remove the resulting exhaust gasses and combustion byproducts from the combustion chamber 102, an exhaust channel or duct 132 can be disposed in the cylinder head 120 and can communicate with an exhaust port 134 that may be selectively opened and closed by an exhaust valve 136.

To introduce fuel to the combustion chamber 102, the engine 100 can be operatively associated with a fuel system 140 that can include a fuel injector 142 that can be secured in the cylinder head 120 and partially disposed into the cylinder 104. The fuel injector 142 can be an electromechanical device that can selectively inject or introduce fuel in precise quantities as an atomized jet into the combustion chamber 102, at particular times during the combustion cycle, and for particular durations of time during the combustion cycle.

To supply the fuel, the fuel system 140 can include a fuel reservoir or fuel tank 144 that contains the hydrocarbon-based fuel, such as diesel fuel, in a liquid state or phase. To direct fuel from the fuel tank 144 to the fuel injector 142, a fuel pump 146, which can be disposed in a fuel line or fuel channel 148 extending between the fuel tank 144 and the fuel injector 142, to pressurize and urge flow of the fuel as necessary. The fuel channel 148 may be an opened or closed loop, and the portion of the fuel channel 148 proximate the fuel injector 142 may be referred to as the fuel rail. Although FIG. 1A illustrates a single fuel injector 142 communicating with a single combustion chamber 102, it should be appreciated that in other embodiments the engine 100 can include different chamber and injector combinations in various arrangements, and thus may include multiple fuel injectors per combustion chamber 102, and/or the fuel injector(s) arranged differently with respect to the combustion chamber 102.

To remove particulate matter and other emissions from the exhaust gasses exiting the combustion chamber(s) 102 via the exhaust duct(s) 132, an aftertreatment system having at least one particulate filter 150 (PF) (in series or parallel) can be disposed in the exhaust duct 132 downstream from the combustion chamber 102 and upstream of an exhaust orifice 152 that may discharge some or all of the exhaust gasses to atmosphere, for instance. As an example, the particulate filter 150 can be a pass-through device that includes an internal, lattice like structure or baffles that may be chemically treated to capture and retain particulate matter from the exhaust gasses directed through it. According to one or more embodiments, the particulate filter 150 may be a diesel particulate filter (DPF). As noted above, the particulate filter 150 may require periodic regeneration to oxidize accumulated particulate matter. In addition to the particulate filter 150, one or more other aftertreatment devices may be disposed in the exhaust duct 132.

To coordinate and control operation of the engine 100 and related components, the engine 100 may be operatively associated with an electronic control module (ECM), electronic control unit, or controller 160. Such control module, unit, or controller may be implemented in or using circuitry. The controller 160 can monitor various operating parameters and responsively regulates the various components that affect engine operation and in-cylinder dosing (ICD), according to some embodiments. The controller 160 can include a microprocessor (e.g., CPU), an application specific integrated circuit (ASIC), or other appropriate circuitry and can have memory (e.g., RAM, ROM, or the like) or other data storage capabilities.

To monitor and control engine operation, the controller 160 can be in electrical or electronic communication, directly or indirectly, with various engine components via a plurality of respective electrical communication lines 161 or communication busses that are indicated as dashed lines in FIG. 1A. Communication between the controller 160 and sensors and controls may be established by sending and receiving digital or analog signals along the electronic communication lines 161. For example, the controller 160 may regulate operation and activation of the fuel injector 142 and may be able to adjust the injection timing and/or injection quantities. As additional examples, controller 160 can also communicate with the crankshaft 114 to determine speed (e.g., via a sensor), the fuel pump 146 to determine fuel pressure (e.g., via a sensor), and sensors in the exhaust duct 132 or particulate filter 150 to monitor the exhaust gas composition or conditions.

The controller 160, using some or all of the foregoing information, can responsively regulate the timing of the combustion cycle of the engine 100 to facilitate regeneration of the particulate filter 150. For example, referring to FIG. 1B, this figure illustrates a timing chart 162 comparing operation of the intake and exhaust valves 126, 136 during the combustion cycle as superimposed with fuel injection events from the injector 142 as determined by the controller 160. The timing chart 162 may be stored as a digital map or executable software program in the controller 160. In the timing chart 162, with respect to operation of the intake and exhaust valves 126, 136, the Y-axis 164 represents lift or displacement of the intake and exhaust valves 126, 136 and the X-axis 166 represents the stage of the combustion cycle in units relating to the angular rotation of the crankshaft 114. Additionally, with respect to fuel injection, the Y-axis 164 represents the occurrence of a fuel injection event, with the duration of the fuel injection event indicated with respect to the X-axis 166, that may also be demarcated with respect to the angular rotation of the crankshaft 114 during the combustion cycle. The solid line 170 may represent displacement of the intake valve 126 while the dashed line 172 may represent displacement of the exhaust valve 136.

Figure 1B:
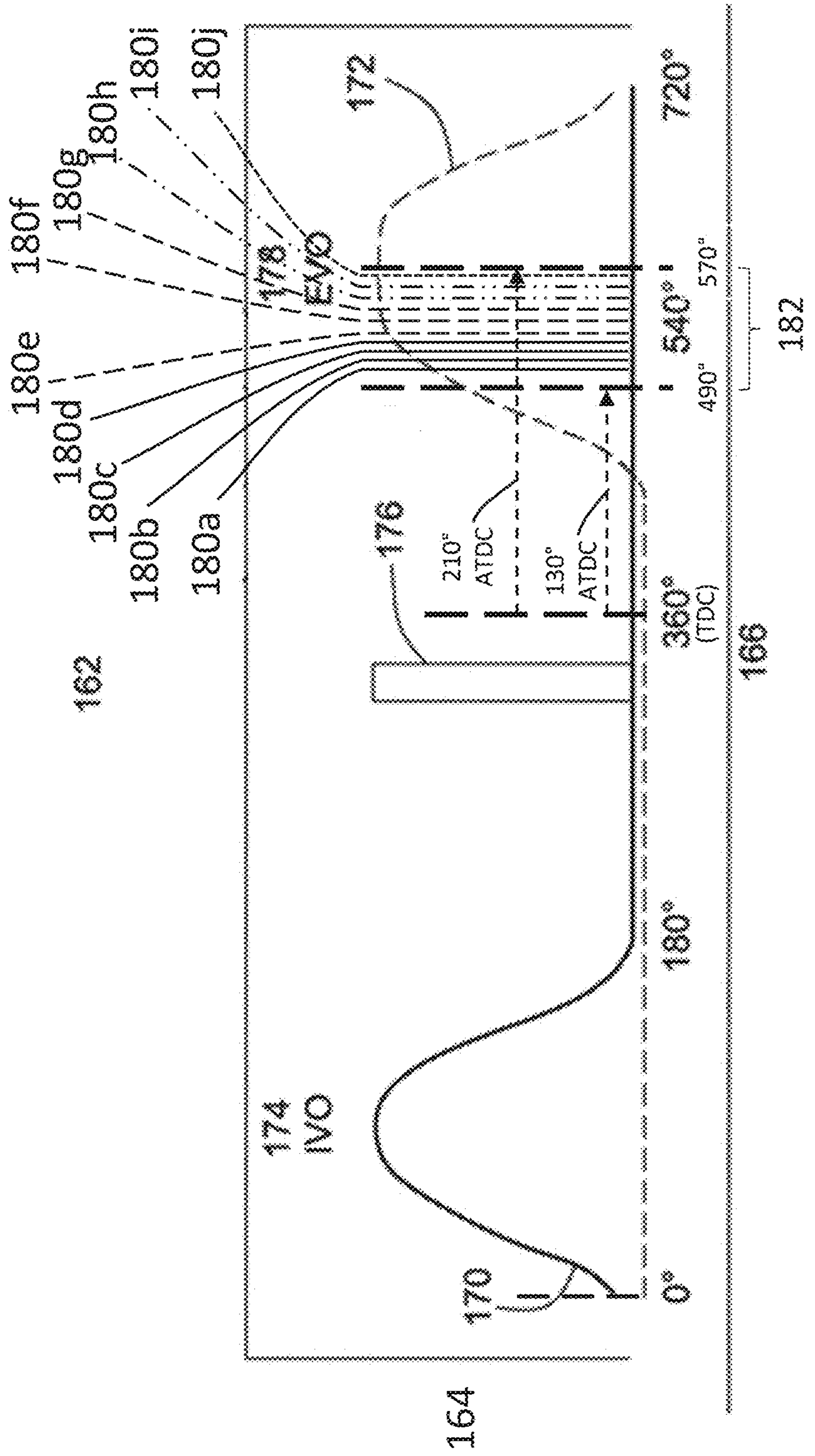
FIG. 1B is a timing chart depicting a relation between valve timing during the combustion cycle and main injection and post injection dosing shots of fuel into the combustion chamber.

Referring to FIGS. 1A and 1B, during the intake stroke, as the piston 110 moves from the TDC position to the BDC position, the intake valve 126 opens as indicated by the hump-shaped IVO (intake valve opened) curve 174 in solid line 170 to enable air to be drawn into the combustion chamber 102. At approximately 180°, the intake valve 126 closes and the piston 110 begins the compression stroke moving toward the TDC position. Before the piston 110 reaches TDC at 360° (e.g., a few degrees), the fuel injector 142 can inject a main injection shot (or shots) of fuel, as indicated by main injection bar 176, for instance, that, when introduced to the elevated pressure in the combustion chamber 102, can ignite and combust in a main combustion event. The main injection shot (or shots) 176 may be comprised of or consist of a predetermined quantity of fuel and a predetermined shot duration. The resulting power stroke displaces the piston 110 downward to the BDC position at 540°, during the course of which the exhaust valve 136 may open as indicated by the hump-shaped EVO (exhaust valve opened) curve 178 in dashed line 172.

As the piston 110 continues past the BDC position at 540° in an exhaust stroke, the piston 110 moves upward within the cylinder and returns to the TDC position. Rising pressure in the combustion chamber 102 due to combustion and the subsequent exhaust stroke of the piston 110 can displace exhaust gasses through the opened exhaust port 134. During the course of the exhaust stroke, the exhaust valve 136 may close as indicated by the negative slope of the hump-shaped EVO (exhaust valve opened) curve 178 in dashed line 172. Once the piston 110 reaches the TDC position in an end of cycle (EOC) position at 720° and the exhaust valve 136 has closed, the piston 110 is ready to begin another combustion cycle.

To entrain vaporized fuel in the exhaust gasses for passively regenerating the particulate filter 150, the controller 160 can direct the fuel injector 142 to inject one or more post-main injection shots after the last main injection shot in a process referred to as "dosing" or, more specifically, "in-cylinder dosing." In FIG. 1B, the vertical lines 180*a*-180*j* partially overlapping with the EVO curve 178 represent exemplary dosing shots 180, according to one or more embodiments of the present disclosure, with each line 180*a*-180*j* representing the occurrence of an individual injection or shot of fuel from the fuel injector 142 into the cylinder 104. In the illustrated embodiment, four solid lines 180*a*-180*d* represent individual dosing shots 180 of a first type, three dashed lines 180*e*-180*g* represent individual dosing shots 180 of a second type, the second type being different from the first type, two dashed lines 180*h*-180*i* represent individual dosing shots 180 of a third type, the third type being different from the first and second types, and one dashed line 180*j* represents an individual dosing shot 180 of a fourth type, the fourth type being different from the first, second, and third types. The number of individual dosing shots 180 and the number of types may vary, as explained below. That is, the dosing shots 180*a*-180*j* are merely examples, and embodiments of the present disclosure can implement more or less dosing shots (including none) of each type of dosing shot.

Timing of the individual dosing shots 180 may be constrained to occur within a specific period, referred to as a temporal dosing window and indicated in FIG. 1B by bracket 182. If the individual dosing shot(s) 180 is/are introduced too soon after the main injection shot 176 and the resulting combustion event, the individual dosing shot(s) 180 may ignite and burn in the combustion chamber 102 before displacement through the opened exhaust port 134 and before reaching the particulate filter 150. If the individual dosing shot(s) 180 is/are introduced too late, however, the individual dosing shot(s) 180 may not adequately mix with the exhaust gasses being discharged through the exhaust port 134. Further, it has been determined that a majority of exhaust gasses traverse through the exhaust port 134 relatively soon after the opening of the exhaust valve 136 during the early portion of the EVO curve 178; if individual dosing shot(s) 180 is/are introduced too late, the corresponding dosing fuel may not get discharged from the combustion chamber 102. In addition, because of the electrical power required to activate the fuel injector(s) 142, it may be desirable to avoid dosing when fuel injectors 142 in other cylinders 104 might be active to avoid overly straining the electrical system of the engine 100. Accordingly, in the embodiment indicated in FIG. 1B, the temporal dosing window 182 may coincide with the later portion of the power stroke just as the exhaust valve 136 opens during the early portion of the EVO curve 178.

Figure 1C:
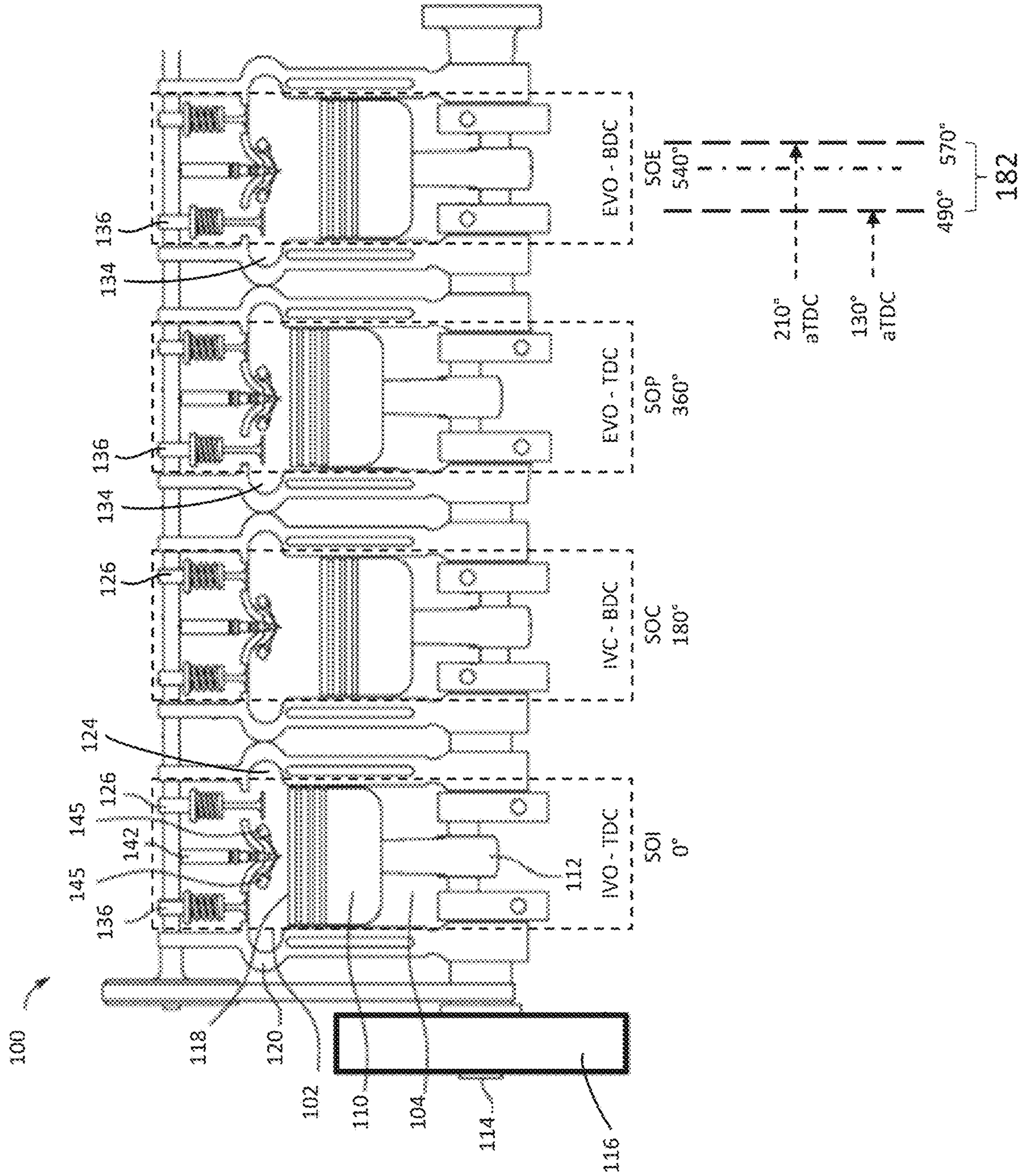
FIG. 1C illustrates a schematic representation of a side sectional view of an in-line, multi-cylinder internal combustion engine, each cylinder having a combustion chamber with ducts, in accordance with one or more embodiments of the present disclosure.

Referring now to FIG. 1C, in accordance with some embodiments, the engine 100 can include a plurality of cylinders 104 (e.g., four cylinders 104). The four cylinders 104 can be mounted in a straight line, for instance, one after another, along the crankshaft 114. The engine 100 can have the piston 110 disposed within each of the engine cylinders 104, and the pistons 110 can be adapted to perform reciprocating movement within the cylinders 104, as discussed above. The pistons 110 can be connected to the crankshaft 114 via the connecting rod 112. The crankshaft 114 can be coupled to a flywheel 116. The flywheel 116 can impart rotational energy to the crankshaft 114 from time to time in order to keep the crankshaft 114 rotating. The flywheel 116 may also be used as a damper to absorb torsional vibrations and to smoothen the power output of the engine 100. The engine 100 may have any number of cylinders 104 for performing operation without departing from the meaning and scope of the present disclosure.

FIG. 1C further illustrates relative positions of the pistons 110 in adjacent cylinders 104 that are at different phases of the combustion cycle, according to some embodiments of the present disclosure. FIG. 1C illustrates a left-most piston 110, which may be referred to or characterized as a first piston 110, in a first phase of the combustion cycle (e.g., start of the intake (SOI) stroke) with the intake-valve 126 open and the piston 110 located at top dead center (IVO-TDC) at 0°. Immediately adjacent thereto, another piston 110, which may be referred to or characterized as a second piston 110, is illustrated in a second phase of the combustion cycle (e.g., start of compression (SOC)) with the intake-valve 126 closed and the piston 110 located at bottom dead center (IVC-BDC) at 180°. Next, yet another piston 110, which may be referred to or characterized as a third piston 110, is illustrated in a third phase of the combustion cycle (e.g., start of power (SOP) stroke) with the exhaust-valve 136 opened and the piston 110 located at bottom dead center (EVO-BDC) at 360°. And adjacent thereto, a right-most-piston, which may be referred to or characterized as a fourth piston 110, is illustrated in a fourth phase of the combustion cycle (e.g., start of exhaust (SOE)) with the exhaust-valve 136 open and the piston 110 located at top dead center (EVO-TDC) at 540°. In this example, none of the pistons 110 are illustrated in the end of cycle (EOC) position at 720°. However, it is understood that in the EOC position the piston 110 would be positioned at top dead center (TDC) with the exhaust valve 134 closed (EVC-TDC) at the end of cycle (EOC), ready for another combustion cycle.

FIG. 1C further illustrates a dashed line at 360° which represents a location of a piston 110 in a main injection and power stroke phase of the combustion cycle (start of power stroke (SOP)) at top dead center (TDC) and moving downward to bottom dead center (BDC), and thus leading to a dosing phase according to embodiments of the present disclosure. According to some embodiments, the temporal dosing window 182 is illustrated at the range between 490°-570° of the combustion cycle indicated by two vertical dashed lines on opposing sides of a third vertical dashed line at 540° indicating the start of exhaust (SOE) phase of the combustion cycle. Dashed arrows indicate that the temporal dosing window 182 for the piston 110, according to some embodiments, can have a start of injection timing for the in-cylinder dosing (ICD) shots 180 synchronized with the phase of the piston 110 at 130° after top dead center (aTDC) of the start of power (SOP) stroke and synchronized with an end of injection timing for the ICD shots 180 with the phase of the piston 110 at 210° after top dead center (aTDC) of the start of power (SOP) stroke, as an example. As another specific example, the temporal dosing window 182 can start at or about at 135° aTDC (+/−1°) and end at or about at 200° aTDC (+/−1°). By way of context, at the window start, the exhaust valve can be just beginning to crack open at or around 130° aTDC. Additionally, the current combustion event in the firing order (neighboring cylinder) can be finishing up its electronic commands (end of firing window). Even though this "next in the firing order injector" can use its own ECM driver, it may be the case that ECM driver commands for some or all of the different cylinders (e.g., neighboring cylinders) do not overlap. The initial opening of the exhaust can cause an outrush of air that can be beneficial to align with as well. This outrush may reduce by at or around 210 degrees aTDC. Because the ICD shots may need to ride this pushed wave, the injections can be by at or around 200 degrees. Injecting later may result in stagnating atomized fuel that is more likely to impinge against the cylinder liner walls. This can cause fuel to oil dilution. During the temporal dosing window 182, the exhaust-valve 136 is open and the piston 110 moves toward bottom dead center (BDC) during the later portion of the power stroke and moves back toward top dead center (TDC) during the early portion of the exhaust phase of the combustion cycle.

Figure 2:
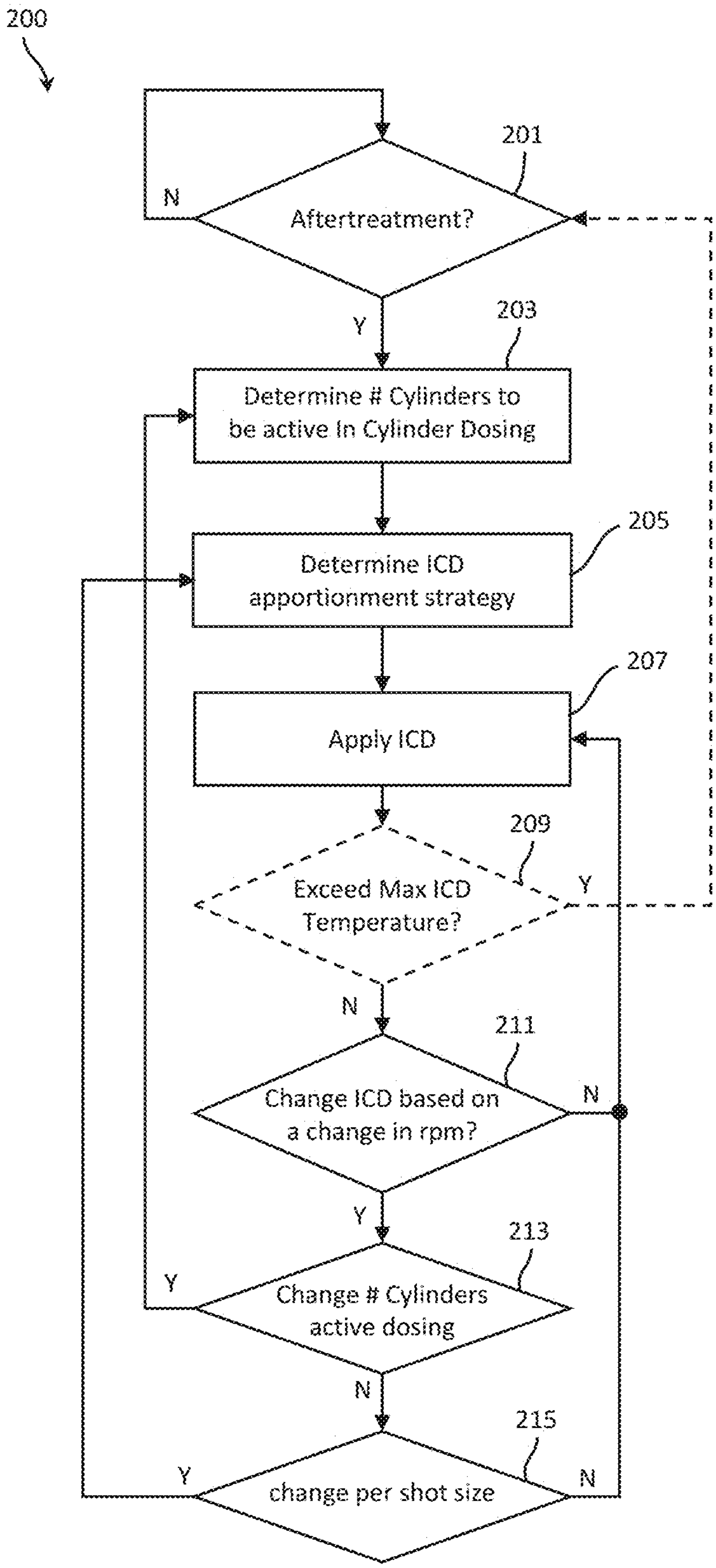
FIG. 2 is a flowchart illustrating a method according to one or more embodiments of the present disclosure.

FIG. 2 illustrates a method of in-cylinder dosing 200 for an engine, such as engine 100, according to some embodiments. At step or operation 201, a determination can be made, for instance, by the controller 160, to perform an aftertreatment cleaning or regeneration operation for the aftertreatment system, or portion thereof, such as aftertreatment device 150. According to one or more embodiments, at operation 201 the controller 160 can determine that the aftertreatment cleaning or regeneration operation is to be performed based on a request for a certain amount of heat for the exhaust, which can be converted to a fuel rate for the engine 100 (i.e., cam-stroke fueling). The requested amount of heat may correspond to an amount of heat to perform the cleaning or regeneration operation for the aftertreatment device 150. Optionally, the requested amount of heat can be based on feedback from a sensor regarding an amount of cleaning or regeneration (e.g., an amount of soot) needed to be performed for the aftertreatment device 150.

At operation or step 203, in the case where it is determined that the cleaning; or regeneration operation for the aftertreatment system is to be performed, a determination can be made, for instance, by or using the controller 160, as to which of the cylinders 104 are to be active for in-cylinder dosing (ICD), In some embodiments, a bitmask, which may be regarded as or referred to as a bitmap, may be used for identifying the active ICD cylinders 104 and for calculating a dosing shot count of the active ICD cylinders 104. In some embodiments, the controller 160 may initially set all of the cylinders 104 as active for ICD the cleaning or regeneration operation for the aftertreatment system until the controller 160 determines one or more of the cylinders 104 are to be deactivated.

Continuing to operation or step 205, the controller 160 can determine an in-cylinder dosing (ICD) apportionment strategy. According to some embodiments, the ICD apportionment strategy can include calculating the number ICD shots and the ICD shot size or sizes to be allocated to each of the active cylinders 104. In some embodiments, the total number of ICD shots allocated to an active cylinder 104 can be maximized such that the shot size of each ICD shot injected in the active cylinder 140 is minimized. In some embodiments, the number of ICD shots may be constrained based on a boost supply, thermal limitations, durability limitations, and/or an available timing window for the ICD shots to be injected. According to some embodiments, the allocation of ICD shots and/or the shot number may not be uniform between the active cylinders 104. Due to an increased variability in shot delivery as the shot number increases, in some embodiments, the desired fueling for each shot can be constrained to a minimum with an amount above the minimum being distributed according to a map vs the cylinder ICD total shot count and the specific shot number.

According to some embodiments, up to 10 in-cylinder (ICD) shots can be provided. The number of ICD shots can be determined for each cylinder 104 and the determined number of ICD shots may be different from one another. In some embodiments, cylinder-specific outputs may be calculated in a next firing cylinder interrupt for the number of ICD shots, a start of combustion (SOC) timing for the first shot, and/or cylinder specific ICD shot durations and dwells.

At step 205, a timing of the ICD shots 180 can be calculated by the controller 160, for instance. To provide the timing of the ICD shots 180 for the injectors 142, an injector waveform can be used. Based on the injector waveform used and considering a worst case statistically significant maximum (SSM), a minimum number of ICD shots 180 may be determined to maintain a high-speed boost power for the engine 100, in such embodiments. For example, if a certain type of injector waveform is used (e.g., from a Bosch-type Common Rail Diesel (CRD) solenoid injector) and a worst case SSM is considered, at least a total of five ICD shots 180 may be used to maintain a high-speed boost power. However, any suitable minimum number of total ICD shots 180 may be utilized based on the injector waveform used to provide the timing and considering the worst case SSM for the engine 100. In some embodiments, a saturation limit related to Joules/shot power use can be defined. For instance, using a CR900 waveform under most operating conditions can allow for 16 shots per cam rev per injector 142. CR900 can stand for or be regarded as CAT Common Rail injector with a max injection capability of 900 $mm^3$ (roughly), and can be an example according to one or more embodiments of the disclosed subject matter.

In some cases, the number of shots per cam rev per injector 142 can be limited to ten shots, for instance, to avoid reaching and/or exceeding the dosing window 182 (e.g., located at 200° aTDC). However, any suitable number of shots may be used. According to some embodiments, maximizing the number of shots can be achieved by determining a smallest possible shot size to be used for the ICD shots 180. The smallest possible shot size may be determined based on manufacturing tolerances of the injector 142, a total max shots allowable, and/or an end of injection (EOI) limits, as examples. According to some embodiments, the ECM software and drivers for the injector 142 can be capable of up to at least 20 shots per cylinder, for instance, so long as the total boost power stays within the limit.

According to some embodiments, a boost power requirement of the engine 100 can be reduced with reduction in boosted current. In such embodiments, it may not be necessary to have a map vs a dynamic current waveform. For instance, in some embodiments, a 4-tier waveform may be used for each ICD shot. Additionally or alternatively, current may be maintained at a hold-in level which can allow for a lower solenoid and ECM driver temperature and/or for more shots for an ICD strategy. Maintaining the current at the lower hold-in level can result in less variability in valve return (e.g., variability within a certain range). As such, an end of injection timing and fueling may also be reduced.

According to some embodiments, in the case of a 4-tier waveform, the 4-tier waveform may include a first tier boosted to a nitro current level. In this regard, the initial pull-in current (nitro) can be all that remains boosted on the waveform. Later tiers of waveform, controlled by FPGA states, can be driven off of a battery (e.g., 24V battery), which has less constraints as a high voltage power supply capacitor. The nitro can turn off the low side FET and can 'chop' current the first time once a predetermined amperage (e.g., 17 amps) is reached. The nitro current level for the first tier may be regarded as a target value (so only one tune to set up) and may be in a range of 12 A to 18 A (inclusive), as an example.

Also at step 205, an ICD first shot start of injection (SOI) timing for a cylinder 104 can be calculated based on a desired EC ICD timing and end of injection (EOI) timing of an overlapping cylinder 104. As discussed earlier, 130° and 200° aTDC, can pertain to the SOI and EOI, respectively. Using the desired ICD timing as input, a timing advance for the ICD first shot SOC timing can be limited based on a previous cylinder's injection, for instance, to reduce hydraulic influence on the ICD injection control. The ICD first shot SOC timing may also be tuned to allow for overlap relative to an end of injection (EOI) timing of an overlapping cylinder 104. For example, if a desired overlap tune is 10 degrees, the ICD timing for a given cylinder 104 can be retarded such that a maximum of 10 degrees of overlap is maintained between other cylinders EOI timings and the ICD start of injection (SOI) timing for the given cylinder 104. As an example, if a desired overlap tune is −10 degrees, the ICD timing for the given cylinder 104 can be retarded such that a minimum of 10 degrees of spacing is maintained between other cylinders EOI timings and the ICD SOI timing of the given cylinder 104. Once the limited ICD first shot SOC timing has been calculated, the SOC of the first ICD shot may be advanced according to the limited EC ICD desired timing plus the output from the ICD socsoi map f(RP) and socsoi etrim (e.g., evaluated at zero dwell).

According to some embodiments, an ICD electronic dwell rate for the timing waveform can be calculated. In some embodiments, a desired ICD dwell rate, for instance, from the ECM, and may be similar to normal control dwell rate, for instance, for a CR900 type configuration. In some embodiments, an ICD dwell rate correction map can be provided, for instance, to allow tailoring of the electronic nominal dwell for small shot sizes and/or a lack of cylinder pressure influence separate from normal shot controls. According to some embodiments, an electronic nominal dwell can be calculated according to the following formulas:

Electronic nominal dwell=(desired dwell rate+ICD dwell rate correction map output); and (1)

ICD dwell rate correction map output=$f$(RP,Previous shot fuel). (2)

In some embodiments, anything except a single recommended minimum ICD rate dwell may be prescribed. Optionally, a dwell E-trim can be calculated the same way as for normal control using the cylinder specific rate dwell trim map in accordance with some embodiments. Normal control may be regarded as common combustion cycle injection control.

In addition, the shot duration can be determined by the CE, according to some embodiments, as follows. A shot and injector specific desired ICD fuel input can be determined from an allocation strategy, in accordance with some embodiments. In some embodiments, an ICD injector specific shot #duration can be determined from inputs of injector specific desired ICD shot #fuel, rail-pressure, and/or previous shot fuel. In such embodiments, a minimum duration map for shot #vs rail-pressure and previous shot fuel (e.g., dwell not included)—10 maps of ICD minimum duration can be utilized. In such embodiments, a common maximum duration map can be utilized. Furthermore, an ICD weight factor map can also be used.

In some embodiments, a first shot weight factor map vs ICD shot #1 fuel can be utilized separate from a common weight factor map, for instance, to allow tailoring to low cylinder pressure conditions. In some embodiments, a single weight factor map for subsequent dwell-controlled ICD shots can be utilized separate from a ccPOST weight factor map, for instance, to allow tailoring to ICD specific dwell and cylinder pressures. In some embodiments, a cylinder specific ICD shot duration E-trim can be determined based on cylinder specific ICD shot fueling and rail-pressure.

According to some embodiments, a boost energy per shot tune may be calculated as follows. An upper limit of this shot tune can be determined by analysis of a single shot boost energy with the configured desired pull-in current. This may assume that each shot has the same boosted duration. For example, the boost energy per shot tune can be calculated as a ratio of the single boost energy to the configured desired pull-in current.

According to some other embodiments, the boost energy per shot tune can be repurposed to limit the total number of shots vs speed for thermal or durability concerns. For example, if the thermal limit of the ECM or injector is determined to have an 8 shot limit at 2120 erpm, the boost limit and boost energy per shot can be calibrated to allow 8 shots/2120 erpm and 13 shots at 8/13*2120=1304 erpm, as an example. Below that speed, in this example, the shot limit can stay at 13 shots with a max limit of 10 ICD shots.

In some embodiments, a total shots per cam rev allowance may be limited by boost supply. In such embodiments, a boost power available tune can be calculated. According to some embodiments, the boost available tune may be calculated using an optional criteria that can be dependent on a battery voltage. In some embodiments, the boost available tune may be a constant value. This boost power available tune can also be repurposed to provide the limit for shots*speed.

The total shots per cam rev allowed may be calculated, according to some embodiments, using the following formula and units:

Total shots per cam rev=(Boost Power available/((Boost energy)/shot)*cam speed), with the result rounded to the floor to find an integer value, where (3)

Units: Watts/((J/shot)*(engine rev)/min)/(120 engine rev sec)/cam rev min))=Floor((boost*120)/energy per shot/ENGSPD). (4)

The combustion shots used per cam rev may be calculated, in accordance with some embodiments, based on the statistically significant maximum (SSM) used and a number of active cylinders, as follows:

Shots per injector=2$d$(SSM); and (5)

Combustion shots used=Shots per injector*active cylinder ratio*number of cylinders. (6)

A minimum ICD shot size can be calculated, according to some embodiments, using the following formula:

Min ICD shot size=2$D$(RP). (7)

Desired ICD shots per cam rev can be calculated, according to some embodiments, using the following formulas:

Receive desired Total ICD fuel in mm$^3$/cam cycle; and (8)

Desired ICD shots=Total ICD fuel/Min ICD shot size, where the quotient is rounded up to the nearest integer (e.g., ceiling function). (9)

ICD shots allowed per cam rev can be calculated, according to some embodiments, using the following formulas:

Boost limited ICD shots=Total shots allowed per cam rev-Combustion shots used per cam rev; (10)

Max ICD shots limited by injector=Active ICD cylinder count*Max ICD shots per injector tune; and (11)

ICD shots allowed per cam rev=MIN(Boost limited ICD shots,Max ICD shots limited by injector). (12)

A number of total ICD shots per cam rev, prior to cylinder specific calculations and timing limitation can be calculated, according to some embodiments, using the following formula:

Total ICD shots=MIN(Desired ICD shots,ICD shots allowed). (13)

A cylinder number rank for extra shots (away from EGR recirculation) can be calculated, according to some embodiments, using the following formula:

Injector rank for extra shot=rank in 2*D* map vs cylinder position. (14)

For example, if populated as 1, 2, 3, 4, 5, 6 the first extra shot can be allocated to cylinder 1, if not disabled by the ICD disablement bitmask. This can be aligned with consideration of the EGR HC ingestion issue to rank the cylinders higher that are further away from recirculation. However, other rankings of the cylinders may also be used.

Base ICD shots and the number of cylinders with extra shots can be determined, according to some embodiments, using the following formulas:

Base ICD shots=(Total ICD shots/Active ICD cylinder count), where the quotient is rounded to the floor integer. (15)

Number of cylinders with an extra shot=Total ICD shots−(Base shots*active ICD cylinder count). (16)

If the cylinder is not disabled by ICD disablement bitmask, and the number of cylinders with extra shots is determined to be greater than or equal to the rank of the cylinder, the number of ICD shots for the cylinder can be one more than the base shots, where:

cylinder ICD shots=Base+1; else, cylinder ICD shots=Base. (17)

A desired ICD shot fuel allocation for the cylinder distributes fueling between cylinders based on the number of shots for the cylinder relative to total. The desired ICD shot fuel allocation for the cylinder, according to some embodiments, can be calculated as follows:

Cylinder total ICD fuel=Total ICD fuel*(Number of ICD shots for cylinder)/(Total ICD shots). (18)

cylinder extra ICD fuel may be regarded as the cylinder's ICD fuel beyond the minimum shot fuel that needs to be allocated. Remaining contribution of fuel can be distributed for each shot according to a 3d map of shot extra fuel apportionment vs cylinder ICD shots and shot number. The cylinder extra ICD fuel, according to some embodiments, can be calculated as follows:

Cylinder extra ICD fuel=Cylinder total ICD fuel−((min fuel)*(cylinder ICD shots)). (19)

A last shot end of injection (EOI) can be based on based on a calculation of first shot SOC+the durations and dwells of the combustion shots to find the EOC+a normal EOCEOI map vs RP and the last shot fuel, as an example. The last shot end of injection (EOI) can be calculated for the ICD strategy, according to some embodiments, as follows:

Last shot EOI=timing of the first shot SOC+duration and dwell times of the combustion shots to find the EOC+a normal EOCEOI map vs RP timing and the timing of the last shot fuel or, alternatively,EOI=timing of the first shot SOC+/(duration and dwell times)+(#injections)*(SOCSOI+EOCEOI). (20)

Regarding the foregoing, dwell commands may be regarded as rate dwell or "hydraulic dwell."

Still referring to FIG. 2, at step 207, the in-cylinder dosing can be applied according to the ICD apportionment strategy determined at step 205. The controller 160 can continue to monitor the speed of the engine 100 and/or an optional temperature sensed at the aftertreatment device (e.g., particulate filter 150), according to some embodiments. Application of the ICD apportionment strategy can regenerate the aftertreatment device according to some embodiments.

Continuing to step 209, which may be optional, the controller 160 can monitor a temperature of the aftertreatment device and determine whether the temperature exceeds a maximum ICD temperature. In a case where the temperature of the aftertreatment device exceeds the maximum ICD temperature, the method can return to step 201 to determine whether the aftertreatment is to continue. In a case where the maximum ICD temperature is not exceeded, the method can continue to step 211.

At step 211, the controller 160 can monitor the speed of the engine 100 and determine whether a change in the ICD treatment is needed, according to some embodiments. The controller may determine that a change in the ICD aftertreatment is needed based on a change in rpm of the engine 100 from an rpm of the engine 100 used to determine the total number of shots to be used during ICD In a case where the controller 160 determines that a change is not required, the method can return to step 207 and can continue to apply in-cylinder dosing under the current ICD apportionment strategy. In a case where the controller 160 determines a change in ICD is required, the method can continue to step 213.

At step 213, the controller 160 can determine whether a change in the number of cylinders should be active for in-cylinder dosing. In some embodiments, a map of total shot number limited by power vs engine speed (e.g., rpm) may be used to make this determination. In a case where it is determined that a change is needed, the method can return to step 203 to determine a new number of cylinders to be active for ICD In a case where it is determined that a change in the number of cylinders to be active for ICD is not needed, the method can continue to step 215. At step 215, the controller 160 can determine whether a change in shot size of the in-cylinder dosing shots is needed. In some embodiments, the map of total shot number limited by power vs engine speed (e.g., rpm) may be used to make this determination. In a case where it is determined that a change is needed, the method can return to step 205 to determine a new shot size to be used for the ICD apportionment strategy. In a case where it is determined that a change in shot size is not needed, the method can return to step 207 to continue application of the ICD strategy.

INDUSTRIAL APPLICABILITY

As noted earlier, some internal combustion engines utilize an emissions treatment device or aftertreatment device which is disposed in the exhaust system of the internal combustion engine. Such devices may utilize a filter (e.g., a diesel particulate filter (DPF)) or catalyst that can operate by physically trapping the emission products or by chemically reacting with the emission products to convert them to other forms that may be addressed more readily. Periodically, though, it may be required to regenerate the aftertreatment device to remove accumulation of particulate matter trapped therein and to restore the device to an acceptably operational state. There may be aggressive fuel system delivery requirements to have small shots with very tight tolerances on shot size. This can help to prevent unacceptable build-up of soot in the oil during regeneration of aftertreatment device. Thus, embodiments of the present disclosure can involve systems and methods for in-cylinder dosing (ICD) of internal combustion engines, for instance, to mitigate (including prevent) fuel to oil dilution that may otherwise occur from any non-combusted portions of injections.

In-cylinder dosing (ICD) may be regarded as a thermal management strategy that uses an in-cylinder injector to inject during the exhaust stroke of a piston to provide unburnt fuel into the exhaust, which can raise the temperature of the exhaust and induce regeneration of one or more aftertreatment devices. Generally, the fuel spray of an injector for combustion can occur during timings which are contained within the piston crater and at high pressures. However, the injection of fuel during the exhaust stroke of an ICD strategy may tend to be directed toward an exposed cylinder wall and when there may be little resistance to the fuel spray or combustion of the fuel. If the ICD shot has too much penetration, the impingement of fuel on the cylinder wall can cause soot formation which gets scraped by the piston rings and can cause Piston-Ring-Liner (PRL) damage and leads to high levels of soot in the oil. Soot in the oil also interferes with the oil's normal wear protection of the engine.

The present disclosure similarly concerns the use of a fuel apportionment strategy for in-cylinder dosing to regenerate an aftertreatment device in the exhaust system of a combustion engine.

The present disclosure may also concern determining cylinders for active in-cylinder dosing and a strategy for apportioning fuel among a plurality of dosing shots to provide a regeneration process.

To better atomize the dosing fuel, it can be advantageous to introduce a plurality of smaller individual dosing shots 180 rather than a single prolonged shot. Additionally, reducing the quantity of dosing fuel per individual dosing shot 180 by, for example, increasing the number of individual dosing shots 180 per combustion cycle, can avoid impinging larger droplets of fuel on the walls of the cylinder 104 that could remain after the exhaust stroke which could contaminate engine oil or could incompletely oxidize allowing additional particulate matter to be formed in a subsequent combustion cycle. For the engine 100, for instance, operating at hundreds or thousands of RPM, each individual dosing shot 180 of the plurality of dosing shots can occur within fractions of a second. However, the maximum number of individual dosing shots 180 possible per combustion cycle can be constrained by the temporal dosing window 182, which may be dynamic, for instance, varying with the engine speed and/or the total quantity of dosing fuel required for regeneration.

According to some embodiments, an EOI limiting strategy may be used during in-cylinder dosing. In a case where the shots are limited by the EOI, the extra shots are reduced first. The EOI for limiting is determined based on the cylinder with the most shots. For example, if an interrupt has only the base shots, and another cylinder has an extra shot, the extra shot is included to determine if extra shots will be removed and base shot fueling is increased. If extra shots are to be removed, the ICD Shot Fuel is recalculated based on the allocation strategy. If the base shot EOI is still beyond the EOI limit, the base shots are reduced by one and the ICD Shot Fuel is recalculated based on the allocation strategy. If the EOI limit continues to be exceeded, shot reduction may be repeated with a min limit of 1 shot.

Figure 3A:
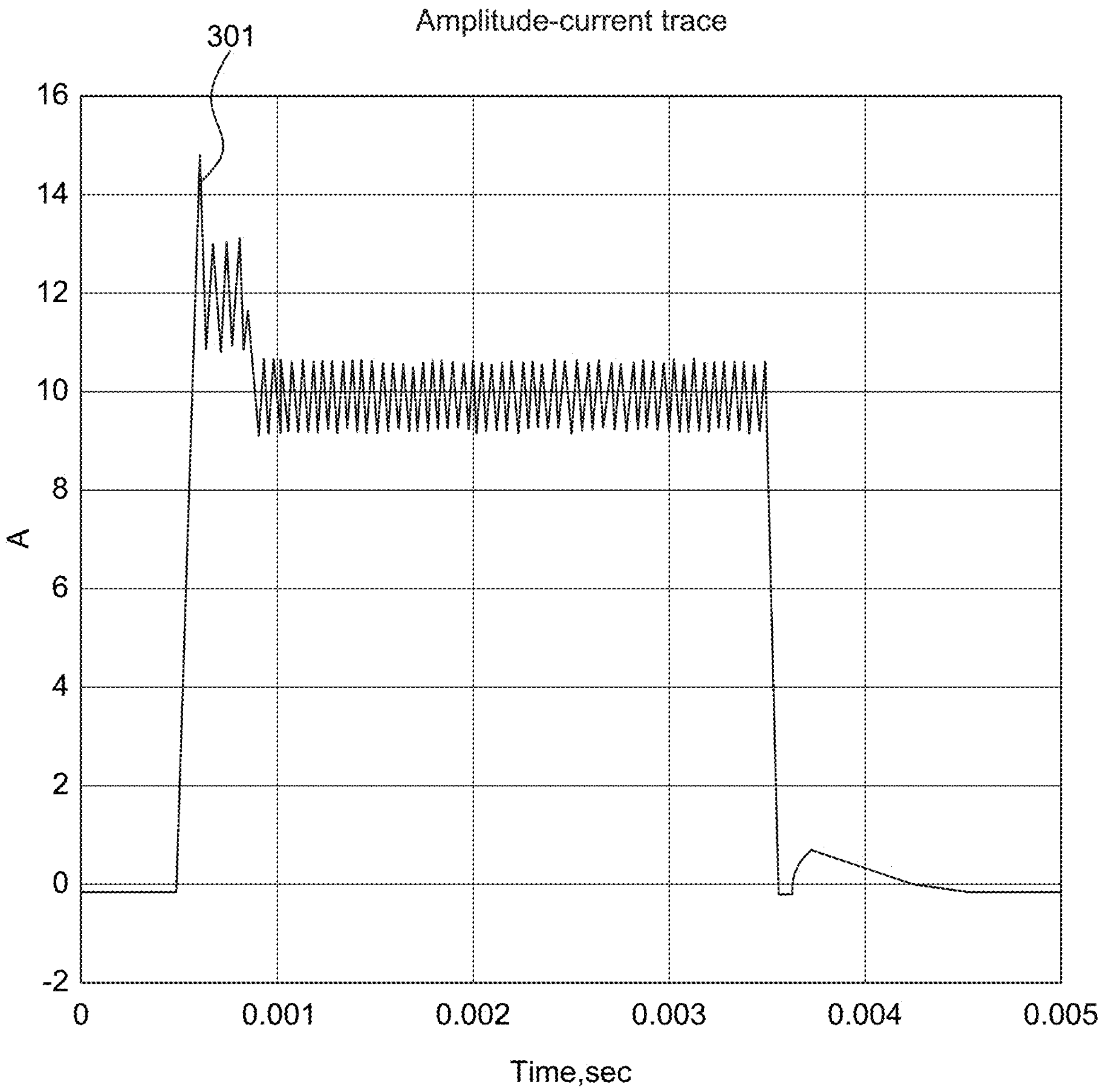
FIGS. 3A-3B illustrate an amplitude-current trace and a graph of total number of shots vs engine speed for active in-cylinder dosing strategies according to some embodiments of the present disclosure.
Figure 3B:
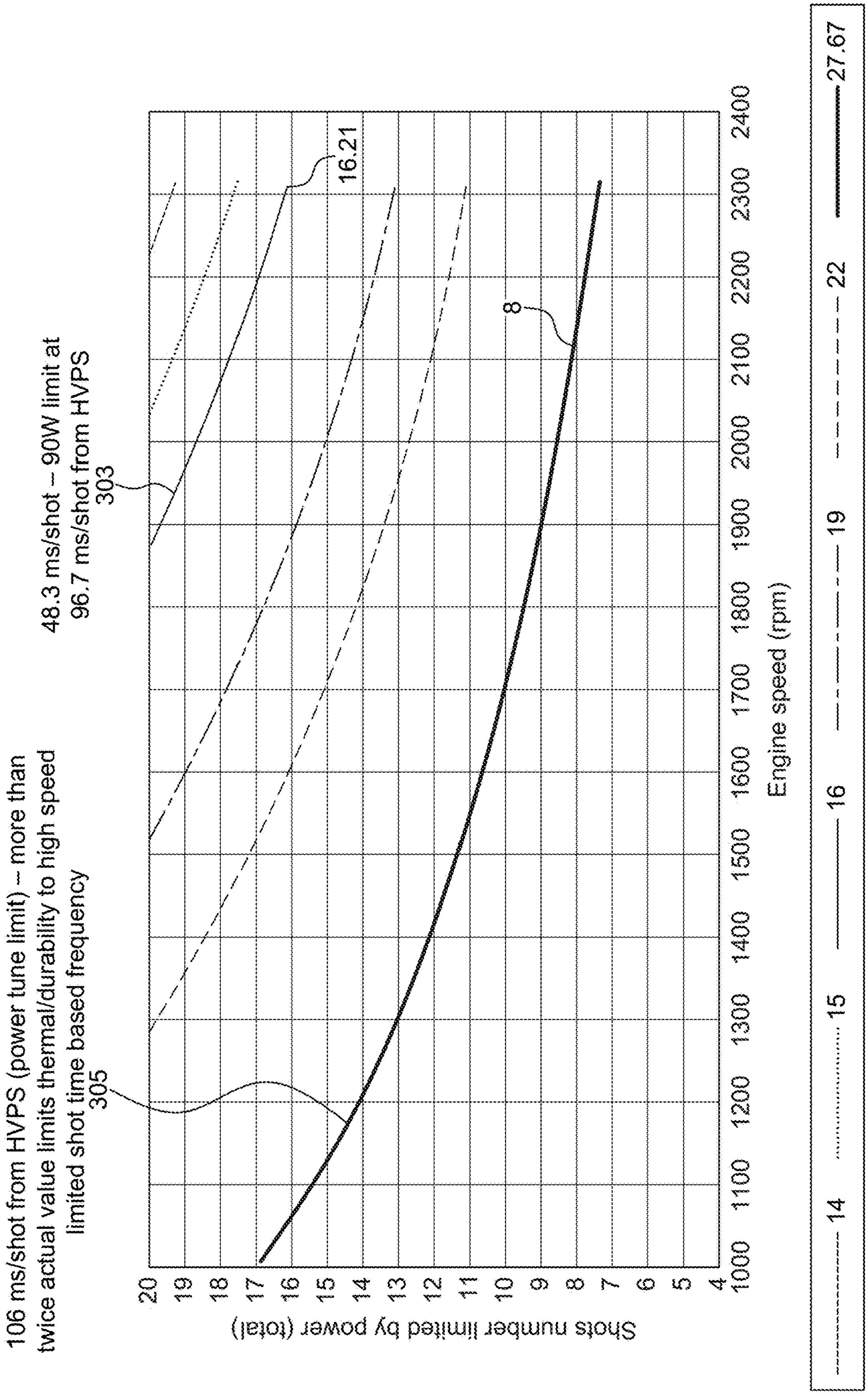

Referring now to FIG. 3A and FIG. 3B, FIG. 3A is a graph that illustrates a preliminary analysis, according to some embodiments, based on 15A A6E4 55V waveform 301. The waveform 301 is an example of a control signal that can be used during ICD dosing that is based on the criteria determined for the ICD shots calculated in step 205 and applied at step 207 of FIG. 2. In some embodiments, the waveform 301 at "optimized" level could be 1 A higher with A6E2, as an example. A6E4 may be regarded as an Adem6 edition4 ECM model.

FIG. 3B is a graph of total shot number limit by power vs engine speed (rpm). Line 303 is an example of HVPS power limit by engine speed. For example, using an 8.3 mJ/shot-90 W limit at 96.7 mJ/shot from HVPS at 2300 rpm the total shot limit is about 16.21 shots. Line 305 is an example for an 8 shot limit at 2120 erpm using 106 mJ/shot from HVPS (power tune limit). FIG. 3B further shows that line 305 provides more than twice the actual value mJ/shot from HVPS as compared to that of Line 303. This limits thermal/durability to high-speed limited shot time based frequency.

FIG. 4A illustrates an ICD Extra Fuel Allocation Map according to some embodiments. In particular, FIG. 4A illustrates an allocation of ICD extra fuel per cylinder total shots according to one or more embodiments of the disclosed subject matter. According to some embodiments, the allocation of extra fuel can be weighted towards the early ICD shots of the total number of ICD shots to be injected. For example, in a case where two ICD shots are to be used during ICD to inject the extra fuel, an allocation of 0.5600 of the extra fuel can be allocated to the first ICD shot and an allocation of 0.4400 of the extra fuel can be allocated to the second ICD shot. In another example, in a case where eight ICD shots are to be used during ICD to inject the extra fuel, an allocation of 0.1526 of the extra fuel can be allocated to the first ICD shot, an allocation of 0.1232 of the extra fuel can be allocated to the second ICD shot, an allocation of 0.1214 of the extra fuel can be allocated to the third ICD shot, an allocation of 0.1211 of the extra fuel can be allocated to the fourth ICD shot, an allocation of 0.1208 of the extra fuel can be allocated to the fifth ICD shot, an allocation of 0.1206 of the extra fuel can be allocated to the sixth ICD shot, an allocation of 0.1203 of the extra fuel can be allocated to the seventh ICD shot, and/or an allocation of 0.1200 of the extra fuel can be allocated to the eighth ICD shot.

Figure 4B:
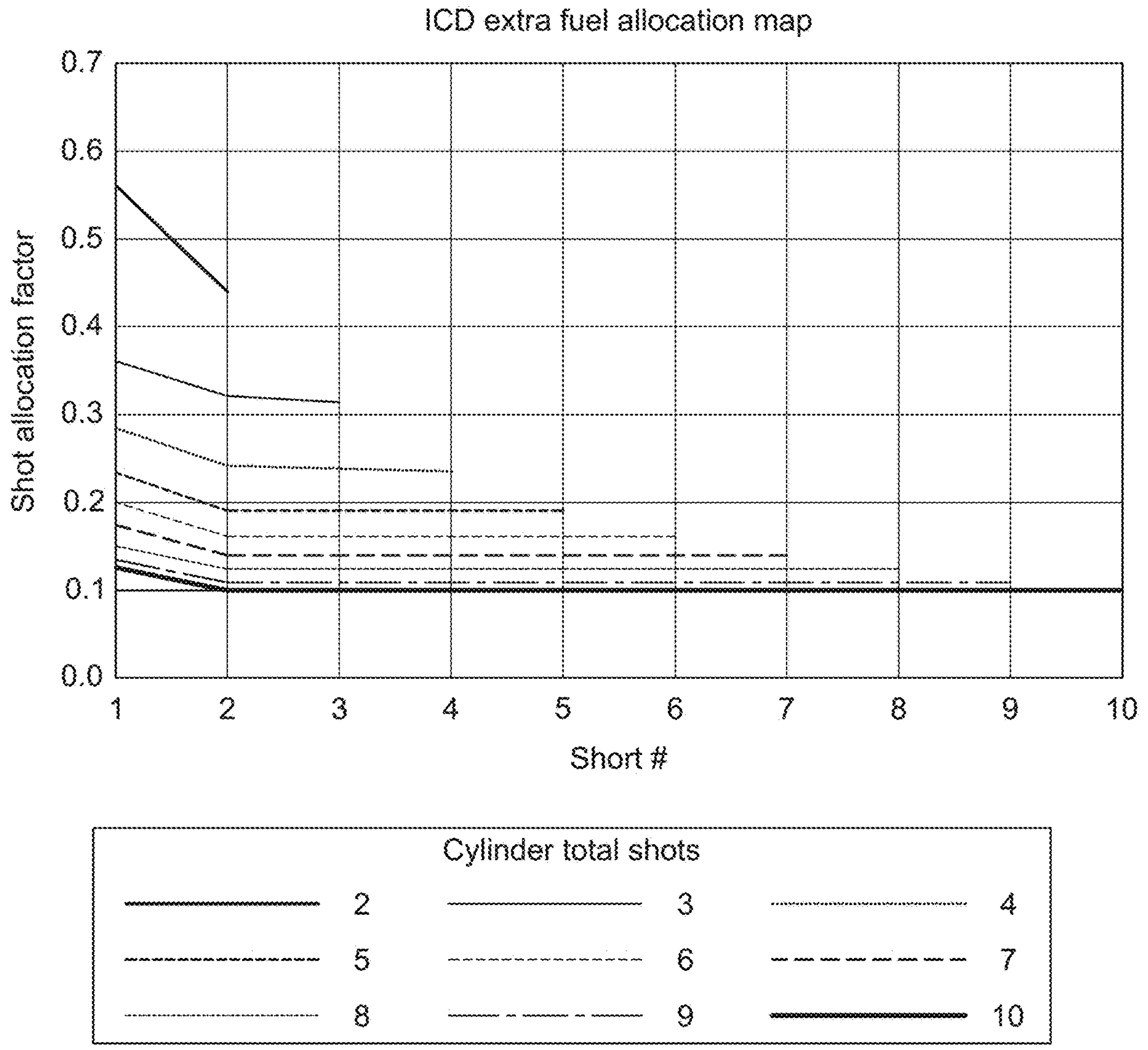

FIG. 4B illustrates the ICD Extra Fuel Allocation Map of FIG. 4A in a line graph form. FIG. 4B illustrates that the allocation of extra fuel is weighted towards the early ICD shots of the total number of ICD shots to be injected and the allocation of extra fuel becomes more uniform towards the later ICD shots of the total number of ICD shots to be injected, according to some embodiments.

Figures 5A, 5B:
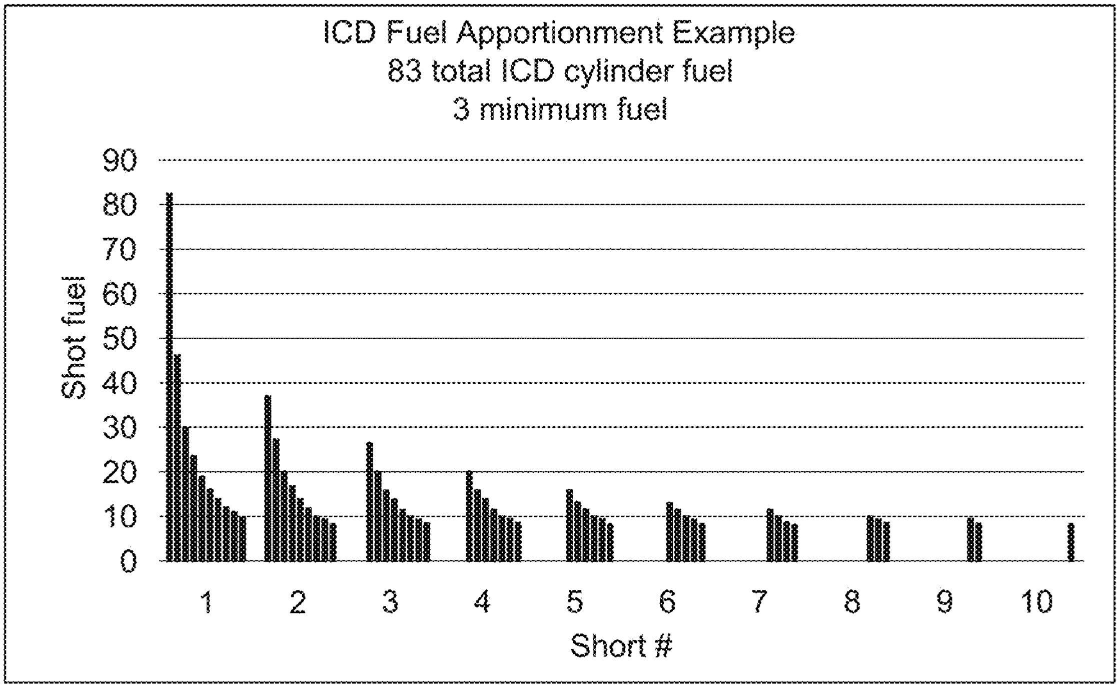
FIGS. 5A-5F illustrate examples of in-cylinder dosing fuel apportionment by shot number per total cylinder shots in accordance with some embodiments of the present disclosure.

FIG. 5A illustrates an example of ICD shot allocation for a cylinder based on a minimum number of fuel shots and the total number of ICD shots to be injected in the cylinder, according to some embodiments. In particular, FIG. 5A is an example of calculating per shot allocation for a total ICD cylinder fuel of 83 ml with a 3 ml shot minimum and using an ICD extra fuel allocation map (e.g., see FIG. 4A), according to some embodiments. The example of FIG. 5A indicates a total apportionment of extra fuel to be injected for each ICD shot and by the total cylinder shots to be used. For example, in a case where 3 total cylinder shots are to be used during ICD to inject 83.0 ml of fuel, an allocation of 29.7 ml of extra fuel is allocated to the first ICD shot, an allocation of 27.0 ml of extra fuel is allocated to the second ICD shot, and an allocation of 26.3 ml of extra fuel is allocated to the third ICD shot. Considering the 3 ml shot minimum for the case where 3 total cylinder shots are used, a total of 77 ml of extra fuel is used during ICD As another example, in a case where 7 total cylinder shots are to be used during ICD to inject 83.0 ml of fuel, an allocation of 13.7 ml of extra fuel is allocated to the first ICD shot, an allocation of 11.7 ml of extra fuel is allocated to the second ICD shot, an allocation of 11.6 ml of extra fuel is allocated to the third ICD shot, an allocation of 11.5 ml of extra fuel is allocated to the fourth ICD shot, an allocation of 11.5 ml of extra fuel is allocated to the fifth ICD shot, an allocation of 11.5 ml of extra fuel is allocated to the sixth ICD shot, and an allocation of 11.5 ml of extra fuel is allocated to the seventh ICD shot. Considering the 3 ml shot minimum for the case where 7 total cylinder shots are used, a total of 62.0 ml of extra fuel is used during ICD FIG. 5A further illustrates that as more shots per cylinder are used during ICD the less extra fuel is used. Once certain injectors (e.g., 1-3) are deemed inactive to ICD it is noted that the strategy can be particularly flexible in its control.

FIG. 5B is a bar graph that illustrates a comparison of shot apportionments for each shot number according to the allocations illustrated in the example of FIG. 5A. Each bar represents a volume of fuel apportioned to an associated shot number for a respective case of total cylinder shots being used during ICD according to some embodiments. As such, shot #1 of FIG. 5B shows ten bars, each of the ten bars represents the apportionment of fuel in shot #1 for each case where the total shots used during ICD is between 1 and 10 total shots, respectively. For example, shot #1 in the case where only one total shot is used during ICD the graph indicates all 83 ml are apportioned to shot #1. Whereas, shot #1 in the case where ten total shots are used during ICD, the graph indicates about 9.5 ml of the total 83 ml are apportioned to shot #1. Furthermore, shot #10 of FIG. 5B, the graph shows a single bar representing the apportionment of fuel (e.g., 8.1 ml) in shot #10 in the case where ten total shots are used during ICD FIG. 5A and FIG. 5B further illustrate that the apportionment of extra fuel is weighted towards the early shots with the apportionment of extra fuel to the later shots being lesser than the extra fuel apportioned to the earlier shots. In addition, FIG. 5A and FIG. 5B illustrate that the greater number of shots used during ICD the more uniform distribution of the fuel apportionment can be distributed across the total number of shots being used. The changes in uniformity may only come into play due to the greater number of shots. The strategy itself can apportion fuel based on a percentage of total fuel using a table, such as the table from FIG. 4A. A percentage change between shots may become less apparent as per shot fueling decreases.

Figures 5C, 5D:
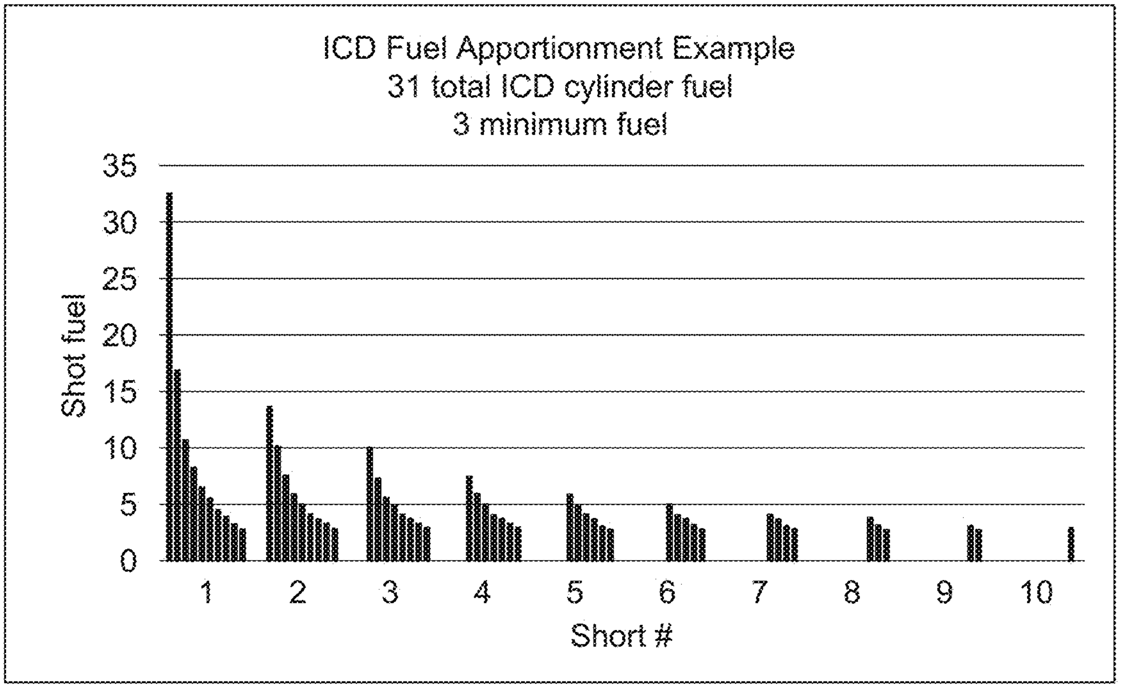

FIG. 5C and FIG. 5D are similar to FIG. 5A and FIG. 5B, respectively. In particular, FIG. 5C is an example of calculating per shot allocation for a total ICD cylinder fuel of 31 ml with a 3 ml shot minimum and using an ICD extra fuel allocation map (e.g., see FIG. 4A), according to some embodiments. The example of FIG. 5C illustrates, for example, a case where 3 total cylinder shots are to be used during ICD to inject 31.0 ml of fuel. In this example, an apportionment of 10.9 ml of extra fuel is allocated to the first ICD shot, an apportionment of 10.1 ml of extra fuel is allocated to the second ICD shot, and an apportionment of 9.9 ml of the extra fuel is allocated to the third ICD shot. Considering the 3 ml shot minimum for the case where 3 total cylinder shots are used, a total of 22.0 ml of extra fuel is used during ICD.

FIG. 5D is a bar graph that illustrates a comparison of shot apportionments for each shot number according to the allocations illustrated in the example of FIG. 5C. FIG. 5D shows ten bars at shot #1, each of the ten bars represents the apportionment of fuel in shot #1 for each case where the total shots used during ICD is between 1 and 10 total shots, respectively. For example, shot #1 in the case where only one total shot is used during ICD the graph indicates all 31.0 ml are apportioned to shot #1. Whereas, shot #1 in the case where ten total shots are used during ICD, the graph indicates about 3.1 ml of the total 31.0 ml are apportioned to shot #1. Furthermore, shot #10 of FIG. 5D, this graph shows a single bar representing the apportionment of fuel (e.g., 3.1 ml) in shot #10 in the case where ten total shots are used during ICD.

Figures 5E, 5F:
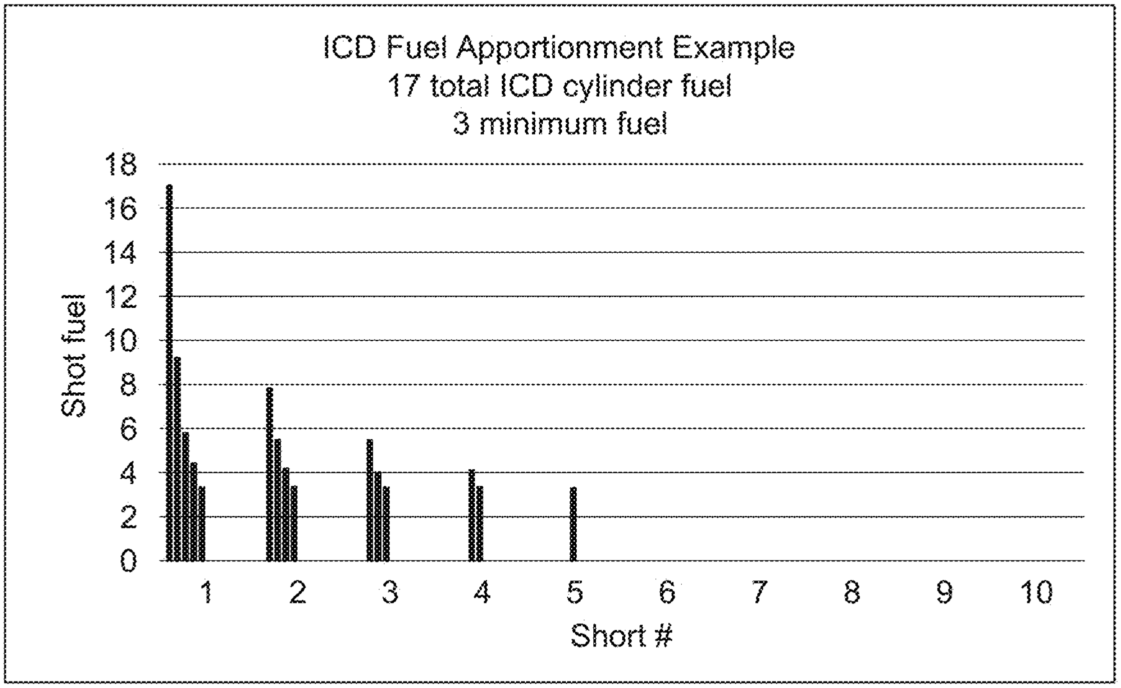

FIG. 5E and FIG. 5F are also similar to FIG. 5A and FIG. 5B, respectively. In particular, FIG. 5E is an example of calculating per shot allocation for a total ICD cylinder fuel of 17 ml with a 3 ml shot minimum and using an ICD extra fuel allocation map (e.g., see FIG. 4A), according to some embodiments. The example of FIG. 5E illustrates, for example, a case where 3 total cylinder shots are to be used during ICD to inject 17.0 ml of fuel. In this example, an apportionment of 5.9 ml of extra fuel is allocated to the first ICD shot, an apportionment of 5.6 ml of extra fuel is allocated to the second ICD shot, and an apportionment of 5.5 ml of the extra fuel is allocated to the third ICD shot. Considering the 3 ml shot minimum for the case where 3 total cylinder shots are used, a total of 8.0 ml of extra fuel is used during ICD.

FIG. 5F is a bar graph that illustrates a comparison of shot apportionments for each shot number according to the allocations illustrated in the example of FIG. 5E. FIG. 5F shows ten bars at shot #1, each of the ten bars represents the apportionment of fuel in shot #1 for each case where the total shots used during ICD is between 1 and 10 total shots, respectively. For example, shot #1 in the case where only one total shot is used during ICD the graph indicates all 17.0 ml are apportioned to shot #1. Whereas, shot #1 in the case where five total shots are used during ICD, the graph indicates about 3.5 ml of the total 17.0 ml are apportioned to shot #1. Furthermore, shot #5 of FIG. 5F, this graph shows a single bar representing the apportionment of fuel (e.g., 3.4 ml) in shot #5 in the case where five total shots are used during ICD In the example illustrated in FIG. 5E and FIG. 5F, due to the 3 ml shot minimum, the extra fuel becomes negative at the sixth shot and beyond. As such, no more than five shots are required during ICD to deliver the total ICD cylinder fuel of 17 ml for this example.

Figure 6A:
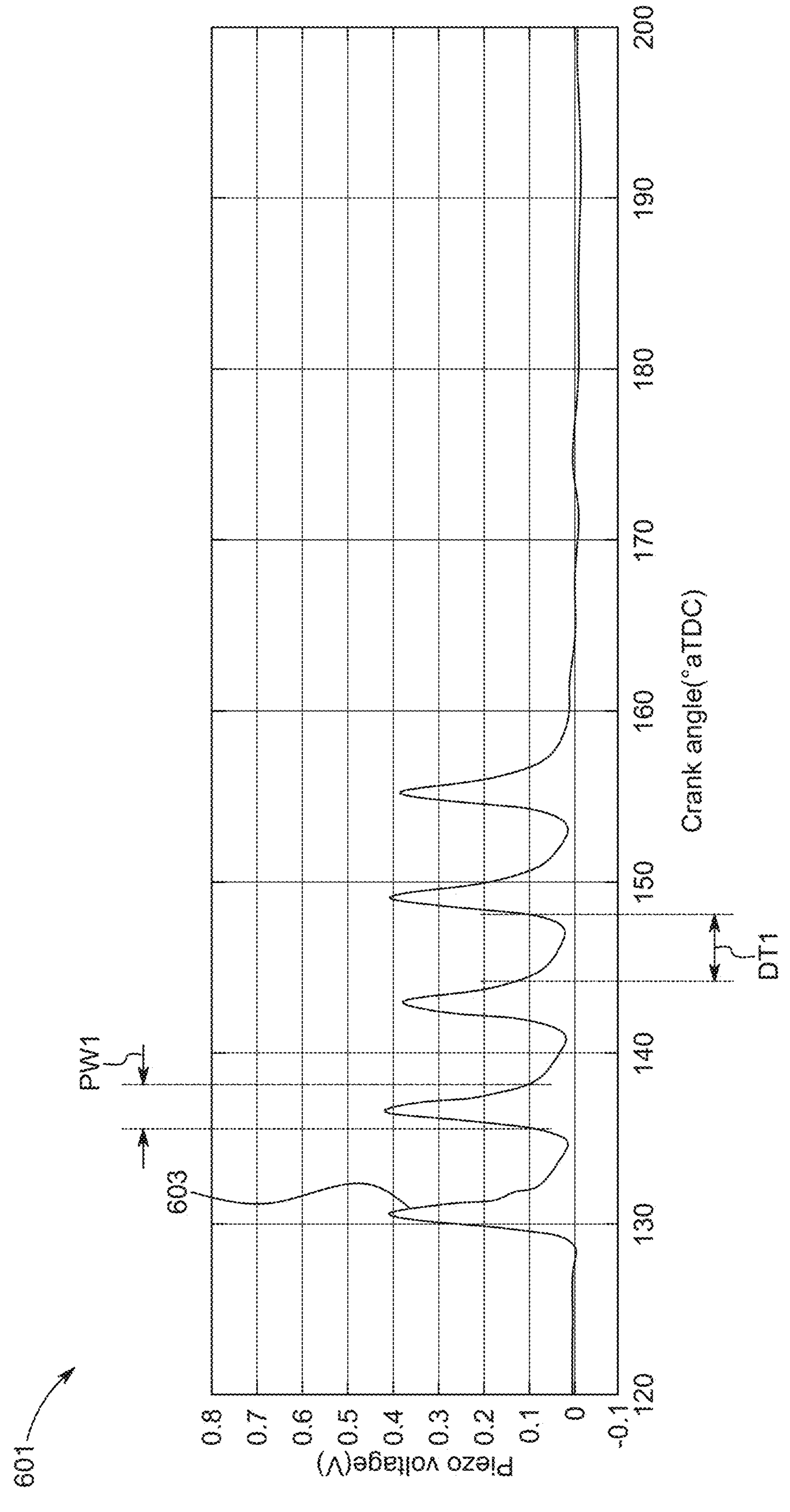
FIGS. 6A-6B illustrate timing signals for power voltage vs crank angle used for active in-cylinder dosing strategies according to some embodiments of the present disclosure.
Figure 6B:
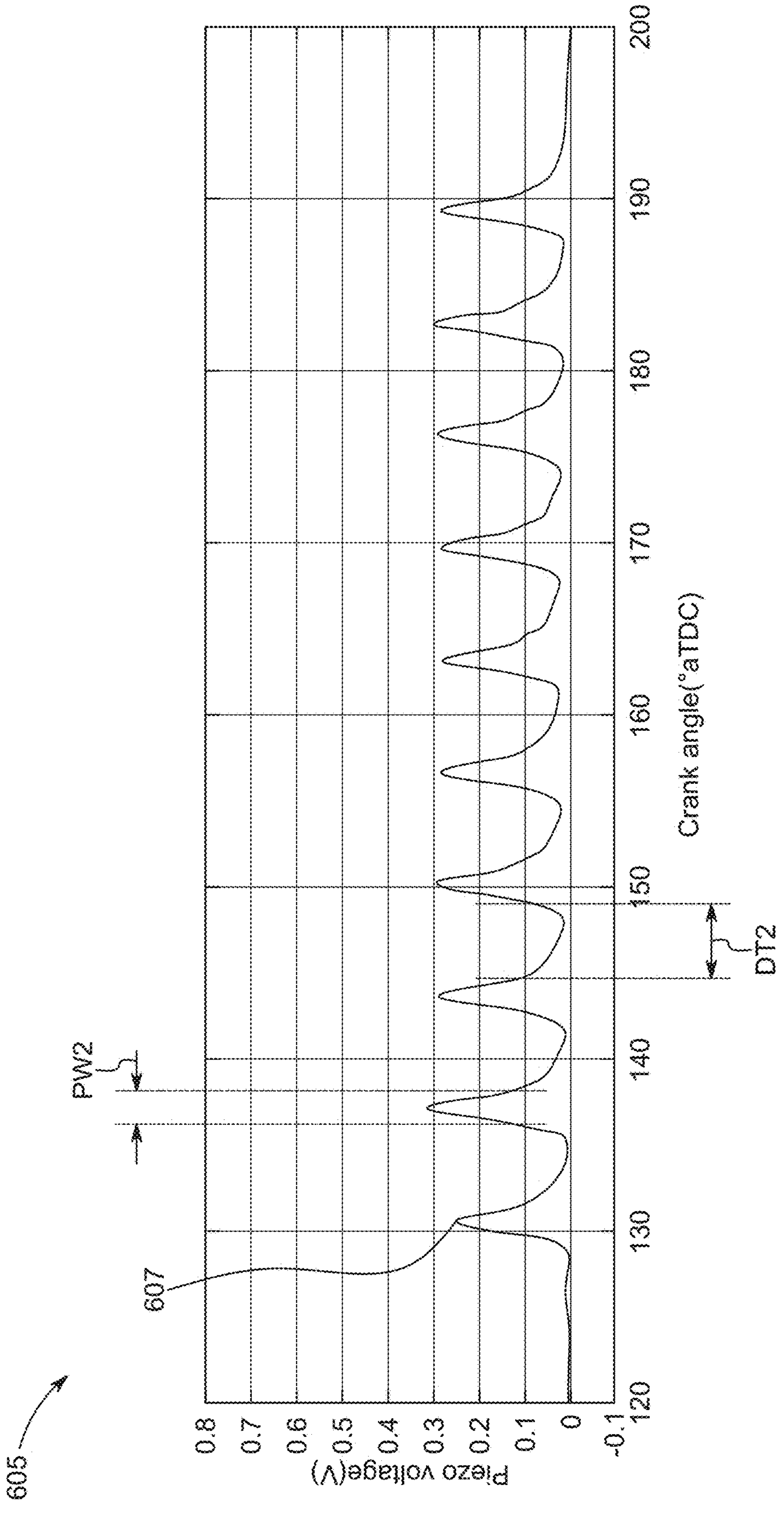

FIG. 6A is a graph illustrating a voltage (V) vs crank angle (degrees aTDC) of a first ICD timing signal 601 for shot injections during ICD in accordance with some embodiments. In particular, FIG. 6B illustrates an example of the first ICD timing signal 601, for instance, for a C13X CR900 engine at 250 MPa with a cycle of five first injection pulses 603 delivering about 4 $mm^3$ per shot. The start of injection (SOI) for the first injection pulses 603 starts at about 130° aTDC and ends at about 156° aTDC. Each of the first injection pulses 603 has a voltage between about 0.1 V minimum to about 0.4 V maximum and a first pulse width (PW1) of about 3° of the crank angle. The first ICD timing signal 601 provides a first dwell time (DT1) between the pulses 603 that is about 4° of the crank angle. However, other voltages, pulse widths and dwell times may be utilized.

FIG. 6B is a graph illustrating a voltage (V) vs crank angle (degrees aTDC) of a second ICD timing signal 605 for shot injections during ICD in accordance with some other embodiments. In particular, FIG. 6B illustrates an example of the second ICD timing signal 605, for instance, for a C13X CR900 engine at 140 MPa with a cycle of ten second injection pulses 607 delivering about 4 $mm^3$ per shot. The start of injection (SOI) for the second injection pulses 607 starts at about 130° aTDC and ends at about 200° aTDC. Each of the second injection pulses 607 has a voltage between about 0.1 V minimum to about 0.3 V maximum and a second pulse width (PW2) of about 2° of the crank angle. The second ICD timing signal 605 provides a second dwell time (DT2) between the second injection pulses 607 that is about 4° of the crank angle. However, other voltages, pressures, pulse widths and dwell times may be utilized.

According to some embodiments, an interleaving strategy may be used which allows the ICD shots 180 to be performed after the next cylinders' normal combustion shots. In such embodiments, the ICD shots 180 can be delayed by up to 30° to prevent hydraulic interference. In embodiments where the ICD shots 180 are to be delayed, overlapping of temporal dosing windows 182 of adjacent cylinders can be tuned. Regarding overlapping tuning, the second main shot can be injector 5 current command, and then injector 1 ICD current commands can come on prior to EOC of the main combustion command for injector 5. Thus, according to embodiments of the disclosed subject matter, ECM driver overlap (entirely or adjacent cylinders) may be avoided, for instance, due to possible electrical interference, as well as because there may be some interplay hydraulically as well due to the rail dynamics. In some embodiments, if a desired number of shots exceed the end of injection (EOI) limit, the shot count is iteratively reduced with relative increase in shot size such that EOI limit is never exceeded. According to some embodiments, a tradeoff with the number of ICD shots 180 and the accuracy of the total ICD fueling can be made with the expected durability and/or service cycle of the injector 142 and the ECM controller 160. Therefore, the maximum number of ICD shots 182 can be adjusted or tuned in a case where the boost power and injection window constraints are too liberal. Liberal may be regarded as the total number of shots can be set at an acceptable medium instead of the theoretical max allowance constrained by boost power and window time. Reasons for doing can be because solenoid coil heat may be approaching dangerous levels and/or total shot count degradation inside the injector can be limiting life. Furthermore, in some embodiments, the distribution of fuel apportioned during ICD can be allocated to have the statistically significant maximum (SSM) shot size as small as possible. FIG. 4A shows an example of fuel apportionment. Alternatively, the fuel apportionment may not be weighted more heavily towards the early shots, or the fuel apportionment can be calibrated flat so all shots are homogeneous. In some embodiments, the distribution of fuel apportioned during ICD may be directed to early shots, for example, a proportion of the fuel apportioned to a first shot may increase as the variation increases at higher shot counts. Thus, generally, non-homogenous extra fuel allocation can be implemented or added in the event that some injectors show higher variance in performance on say a later shot (e.g., shot #7 compared to an earlier shot (e.g., shot #1). According to one or more embodiments, more shots can mean more shot variation and, consequently, non-common performance of later shots. As such, metering the fueling shot size down for later shots can mitigate this situation, though embodiments of the disclosed subject matter are not necessarily limited to such metering down.

In some embodiments, the fuel can be apportioned using an uneven distribution (e.g., gradient, tunable distribution, tiered distribution, or the like) across the ICD shots 182 such that the total amount of fuel determined to be used is apportioned during in-cylinder dosing and there is no remainder. In some embodiments, if a shot quantity variation becomes large in the later shots, less fuel can be apportioned to these later shots to limit the effects of large variations. For instance, a cylinder can have eight (8) ICD shots numbered sequentially. Shots #7 & #8 are later shots that may not perform as expected from mapped nominal injector expectations.

According to some embodiments, a reduced waveform current can be used which limits the boost power and becomes more of a thermal limitation. In such embodiments, an ICD shot 180 limit can be determined based on speed or revolutions per minute (rpm). In some embodiments, the cylinder shot distribution can be managed to reduce and/or prevent the ingestion of hydrocarbon (HC) through the Exhaust Gas Recirculation (EGR) loop during in-cylinder dosing. According to some embodiments, in order to mitigate the ingestion of hydrocarbon (HC) through the Exhaust Gas Recirculation (EGR) loop, in-cylinder dosing (ICD) may be reduced and/or disabled from fuel injectors 142 that are near or proximate the EGR valve that can ingest the unburnt fuel.

The present disclosure is applicable to passively regenerate an aftertreatment device 150 in the exhaust system of an engine 100. A strategy modification was made to increase flexibility of the dosing strategy and avoid wetting the cylinder liner walls with fuel (over-penetration from large shot sizes). When an aftertreatment total fueling command arrives, the ECM provides as many ICD shots as allowed by the ECM high voltage power supply. This is a function of a pre-mapped millijoules per shot tune and is a function of engine speed, number of combustion cycle shots, and active-inactive for ICD allowance (certain cylinder locations benefit from not dosing). Within a ten shot limit per injector, the strategy allocates the total fuel in discrete additions of individual injector min shot quantity for active ICD injectors until the max shots allowed, then increasing the per shot quantity with the max shots allowed to meet total fuel demand. In the event any injector reaches an EOI (End of Injection) limit, then the shot count is reduced, and the lost fuel is redistributed. The ultimate effect is the engine customer only needs to request a certain amount of heat while operating (converted to a fuel rate), and this strategy will deliver as many shots as are needed to meet the demand while minimizing impact to cylinder wall oil film wetting.

The methods and ICD strategy described herein allows for easy deactivation of ICD on certain cylinders which is also referred to herein as EGR scavenging and while still accommodating enough heat in the exhaust to successfully perform regeneration of the aftertreatment device without affecting the EGR valves. Agile fuel apportionment according to some embodiments allows for calibration limits related to injector solenoid heat, total max shots allowable, and/or end of injection (EOI) limits with no iterative control needed. In accordance with some embodiments, a request for an amount of heat to be used while operating is received. The request can be converted to cam-stroke fueling and the cam-stroke fueling is used to determine an optimal number of ICD shots 180 to be apportioned per injector with the least amount of oil dilution occurring during in-cylinder dosing.

The terms "data," "content," "information" and similar terms may be used interchangeably, according to some example embodiments of the present invention, to refer to data capable of being transmitted, received, operated on, and/or stored. Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof

The invention claimed is:

1. An engine comprising:

a plurality of combustion chambers each having a piston reciprocally movable therein to perform a combustion cycle;

an aftertreatment device disposed in an exhaust system communicating with the plurality of combustion chambers;

a plurality of injectors disposed one each in the plurality of combustion clambers to introduce a total regeneration quantity of dosing fuel for regenerating the aftertreatment device; and a controller communicating with the plurality of injectors and configured to group the plurality of combustion chambers into active combustion chambers and inactive combustion chambers such that the total regeneration quantity of dosing fuel is collectively introduced via the fuel injector of each active combustion chamber during an in-cylinder (ICD) control, and to determine a number of dosing shots to performed by the fuel injector of each active combustion chamber so as to achieve the total regeneration quantity of dosing fuel, wherein a first total apportionment of the dosing fuel is allocated to the injector of a first active combustion chamber, wherein a distribution of the first total apportionment of dosing fuel is non-uniform across the determined number of dosing shots for the first active combustion chamber, and wherein the controller uses a bitmap to identify the combustion chambers to be active for introducing, the total regeneration quantity of dosing fuel.

2. The engine of claim 1, wherein the controller is further configured to determine an amount of heat needed for regenerating the aftertreatment device and converts the amount of heat into a cam-stroke fueling strategy to determine the number of dosing shots per injector for each of the active combustion chambers.

3. The engine of claim 1, wherein the controller is further configured to use a 4-tier waveform and maintain a current at a hold-in level for each dosing shot.

4. The engine of claim 1, wherein a second total apportionment of the dosing fuel is allocated to the injector of a second active combustion chamber, a distribution of the second total apportionment of dosing fuel being non-uniform across the dosing shots determined for the second active combustion clamber and the second total apportionment of dosing fuel being different from the first total apportionment of dosing fuel.

5. The engine of claim 1, wherein the determined number of dosing shots for each of the active combustion chambers is two or greater, wherein the non-uniform distribution of the first total apportionment of dosing fuel decreases per successive dosing shot of the determined number of dosing shots for each of the active combustion chambers, and wherein the determined number of active combustion chambers is less than a total number of the plurality of combustion chambers.

6. A method of operating an engine, the engine including, a plurality of cylinders each having a piston reciprocally movable therein to perform a combustion cycle, an aftertreatment device disposed in an exhaust system, and a plurality of injectors disposed one each in the plurality of cylinders to introduce a total regeneration quantity of dosing fuel for regenerating the aftertreatment device, the method comprising:

converting an amount of heat needed for regenerating the aftertreatment device into a cam-stroke fueling strategy;

determining a number of active cylinders to introduce the total regeneration quantity of dosing fuel based on the cam-stroke fueling strategy;

calculating a total dosing fuel apportionment of the total regeneration quantity of dosing fuel for each of the active cylinders based on the cam-stroke fueling strategy;

determining a number of dosing shots per injector for each of the active cylinders based on the total dosing fuel apportionment;

apportioning an amount of dosing fuel for each dosing shot according to the cam-stroke fueling strategy;

actuating the injectors of the active cylinders to inject the total regeneration quantity of dosing fuel in the apportioned amounts for each dosing shot; and determining a cylinder number rank of the active cylinders to introduce extra dosing shots.

7. The method of claim 6, further comprising:
using a bitmap to identify the active cylinders.

8. The method of claim 6, wherein calculating the total dosing fuel apportionment of the dosing fuel for each of the active cylinders comprises:
calculating the dosing shot apportionments based on a single shot boost energy and a predetermined pull-in current.

9. The method of claim 6, wherein calculating the total dosing fuel apportionment of the dosing fuel for each of the active cylinders comprises:
calculating the dosing shot apportionments based on an engine speed.

10. The method of claim 6, wherein
determining the cylinder number rank is based on cylinder positions.

11. The method of claim 10, wherein determining the number of dosing shots per injector for each of the active cylinders further comprises:
determining a number of cylinders to allocate an extra dosing shot; and
allocating the extra dosing shot to the cylinders based on the cylinder number rank.

12. The method of claim 6, wherein calculating the total dosing fuel apportionment of the dosing fuel for each of the active cylinders further comprises:
distributing extra dosing fuel for each shot according to a map of extra fuel apportionment per shot versus cylinder dosing shots and shot number.

13. The method of claim 6, wherein said determining the number of active cylinders determines that the number of active cylinders is less than a total number of the plurality of cylinders.

14. A non-transitory computer readable storage device comprising a program that when executed by circuitry in an engine configures the circuitry to perform in-cylinder dosing (ICD) control for the engine, wherein
the circuitry is configured by the program to control in-cylinder dosing (ICU) for regenerating an aftertreatment device associated with the engine, the program causing the circuitry to further perform:
converting an amount of heat needed for regenerating the aftertreatment device into a cam-stroke fueling strategy;
determining a number of active cylinders of the engine to introduce dosing fuel based on the cam-stroke fueling strategy;
calculating a total dosing fuel apportionment of the dosing fuel for each of the active cylinders based on the cam-stroke fueling strategy;
determining a number of dosing shots for each of the active cylinders based on the total dosing fuel apportionment;
apportioning an amount of dosing fuel for each dosing shot according to the cam-stroke fueling strategy; and
actuating injectors of the engine associated with each of the active cylinders to inject the dosing fuel in the apportioned amounts for each dosing shot,
wherein said calculating the total dosing fuel apportionment of the dosing fuel for each of the active cylinders includes the program causing the circuitry to further perform:
calculating the dosing shot apportionments based on a single shot boost energy.

15. The non-transitory computer readable storage device of claim 14, wherein the program causing the circuitry to further perform:
identifying the active cylinders based on a bitmap.

16. The non-transitory computer readable storage device of claim 14, wherein calculating the dosing shot apportionments is further based on a predetermined pull-in current.

17. The non-transitory computer readable storage device of claim 14, wherein calculating the total dosing fuel apportionment of the dosing fuel for each of the active cylinders comprises the program causing the circuitry to further perform:
calculating the dosing shot apportionments based on an engine speed.

18. The non-transitory computer readable storage device of claim 17, the program causing the circuitry to further perform:
determining a cylinder number rank of the active cylinders to introduce extra dosing shots.

19. The non-transitory computer readable storage device of claim 17, wherein calculating the total dosing fuel apportionment of the dosing fuel for each of the active cylinders further comprises the program causing the circuitry to further perform:
distributing extra dosing fuel for each shot according to a map of extra fuel apportionment per shot vs. cylinder dosing shots and shot number.

20. The non-transitory computer readable storage device of claim 14,
wherein said determining the number of active cylinders determines that the number of active cylinders is less than a total number of the plurality of cylinders,
wherein the determined number of dosing shots for each of the determined active cylinders is two or greater, and
wherein the non-uniform distribution of the first total apportionment of dosing fuel decreases per successive dosing shot of the determined number of dosing shots for each of the active cylinders.

* * * * *